Sept. 14, 1954 W. F. LUTHER 2,688,863
APPARATUS FOR THE CONTINUOUS MERCERIZATION OF COTTON
Filed Oct. 9, 1950 12 Sheets-Sheet 1
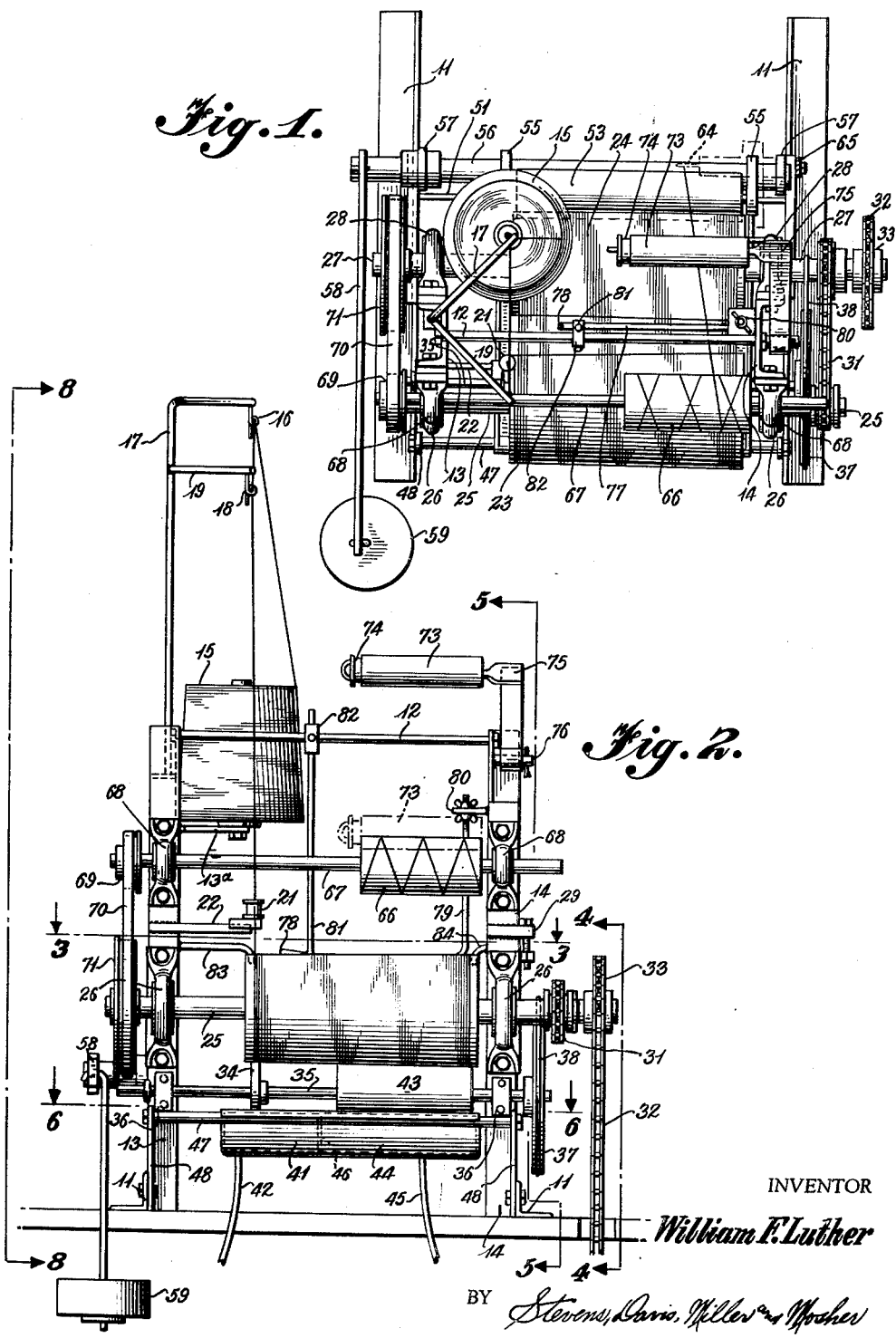
INVENTOR
William F. Luther
BY
Stevens, Davis, Miller & Mosher
ATTORNEYS Sept. 14, 1954      W. F. LUTHER      2,688,863
APPARATUS FOR THE CONTINUOUS MERCERIZATION OF COTTON
Filed Oct. 9, 1950      12 Sheets-Sheet 2
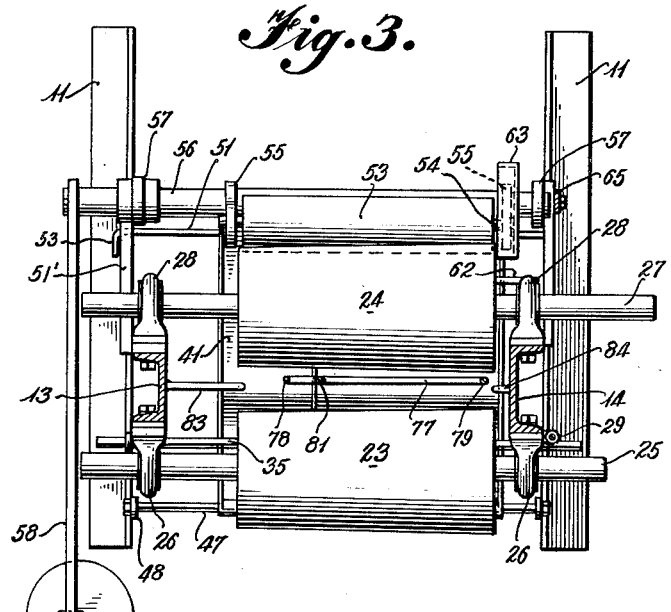
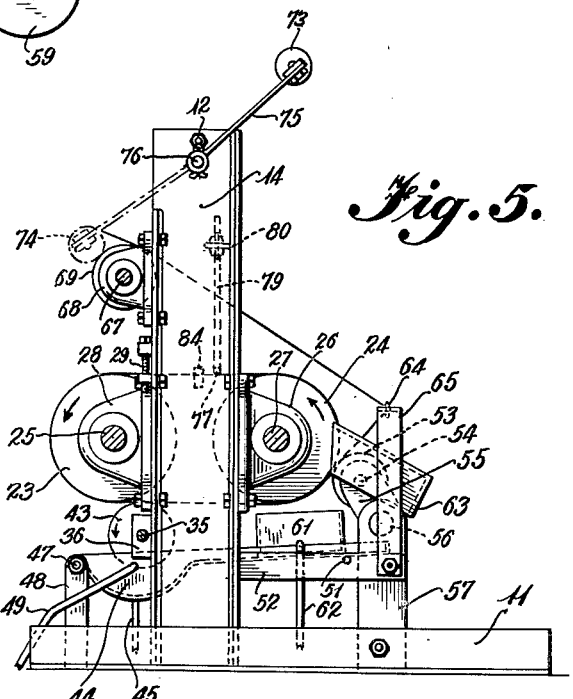
INVENTOR
*William F. Luther*
BY *Stevens, Davis, Miller & Mosher*
ATTORNEYS

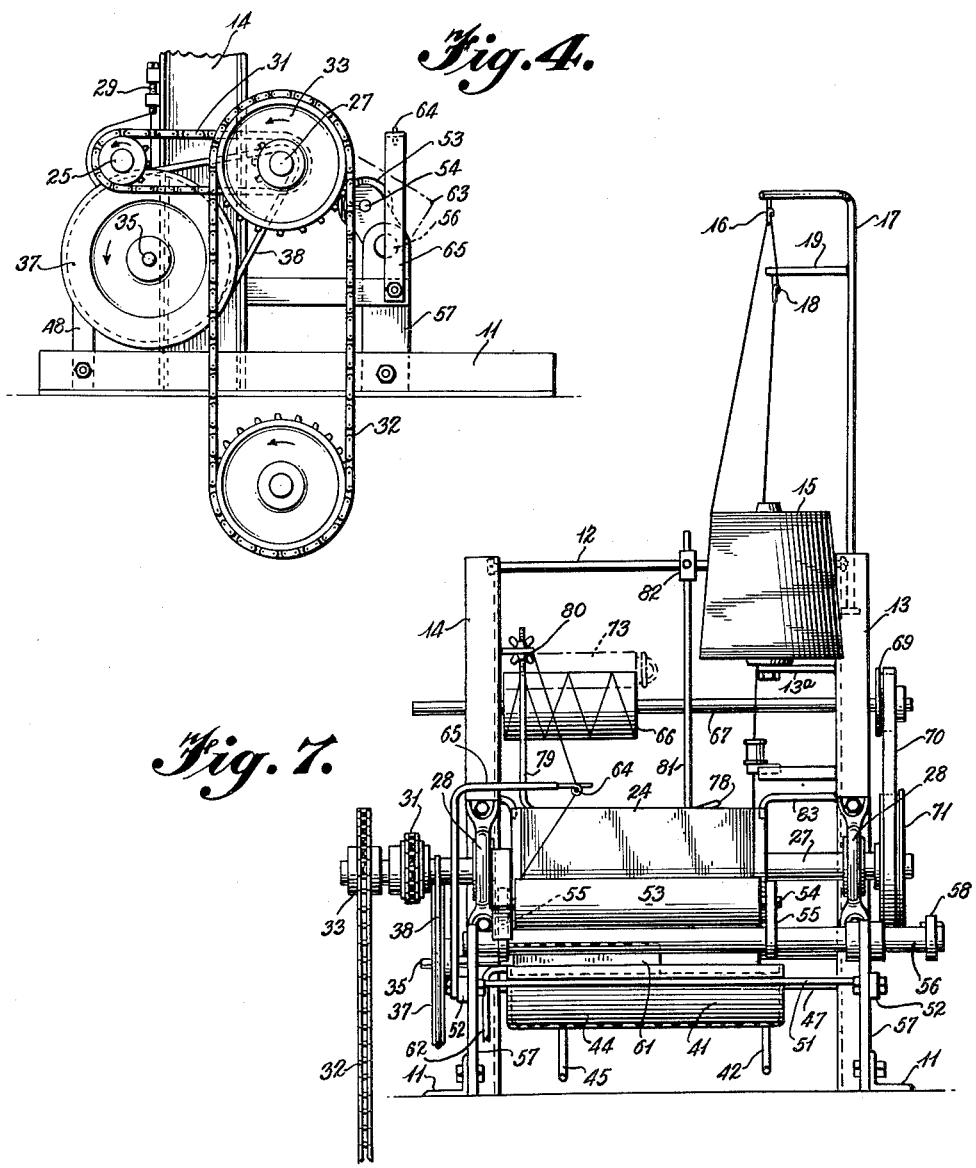

Sept. 14, 1954   W. F. LUTHER   2,688,863
APPARATUS FOR THE CONTINUOUS MERCERIZATION OF COTTON
Filed Oct. 9, 1950   12 Sheets-Sheet 4
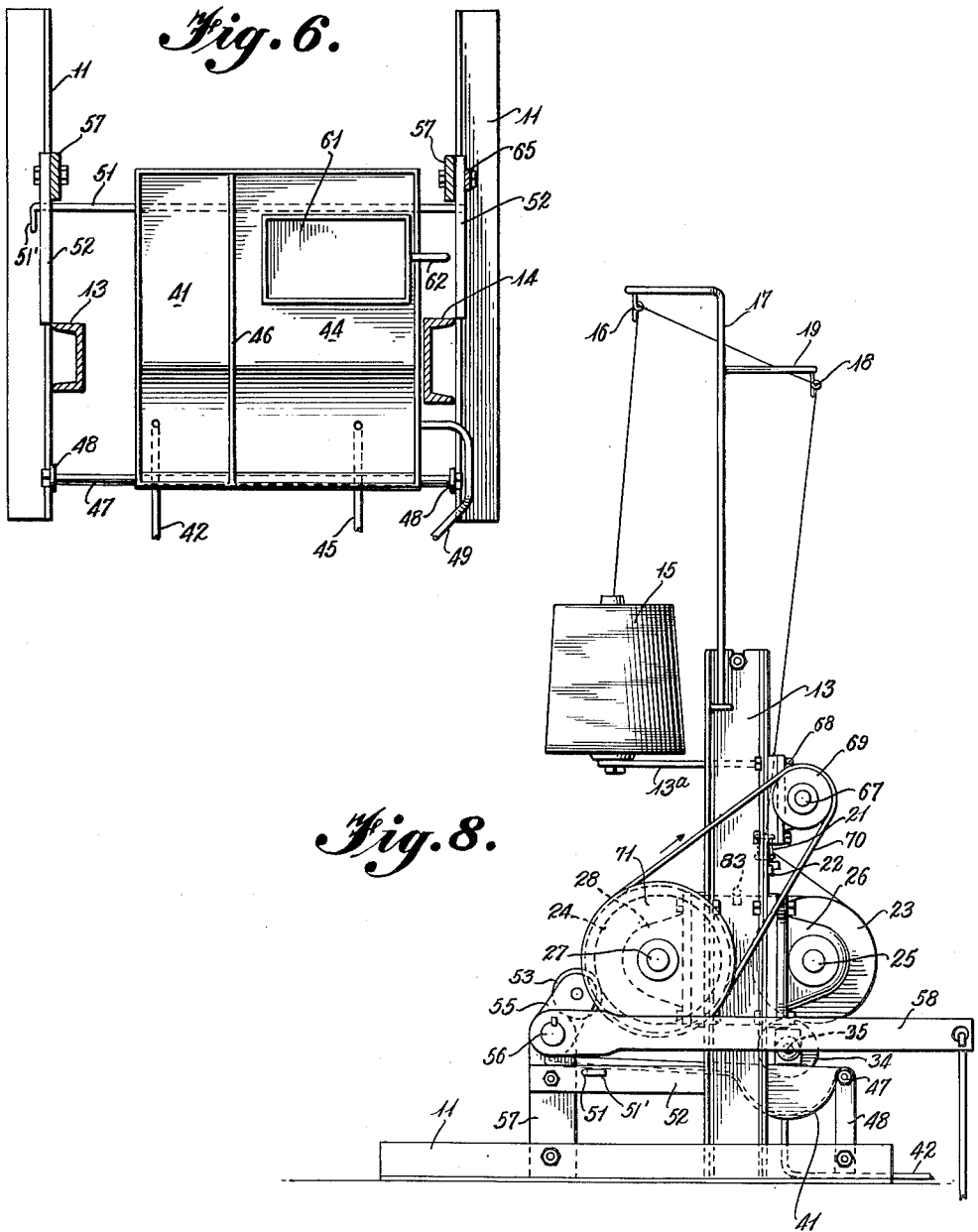
INVENTOR
William F. Luther
BY Stevens Davis, Miller and Mosher
ATTORNEYS

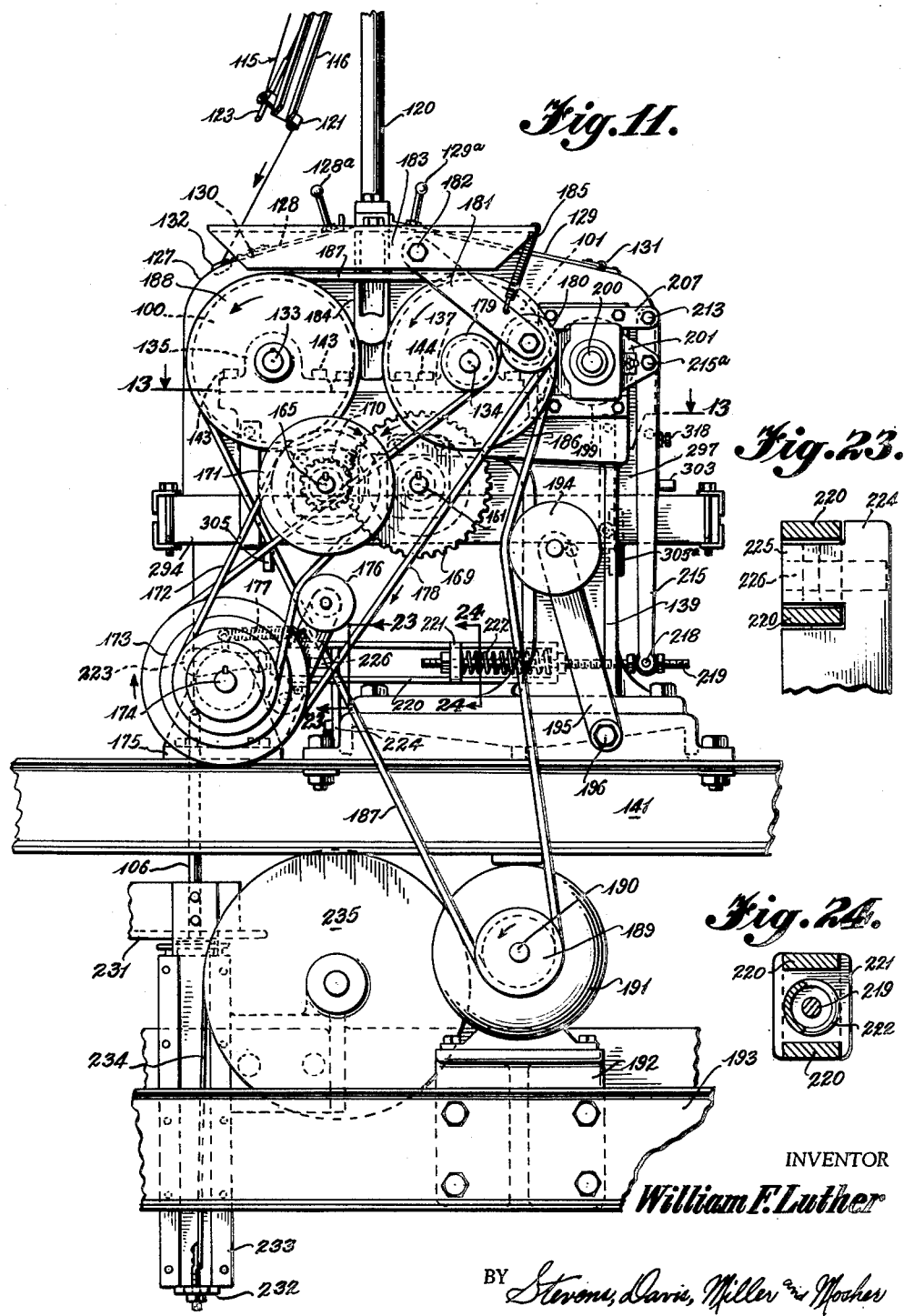

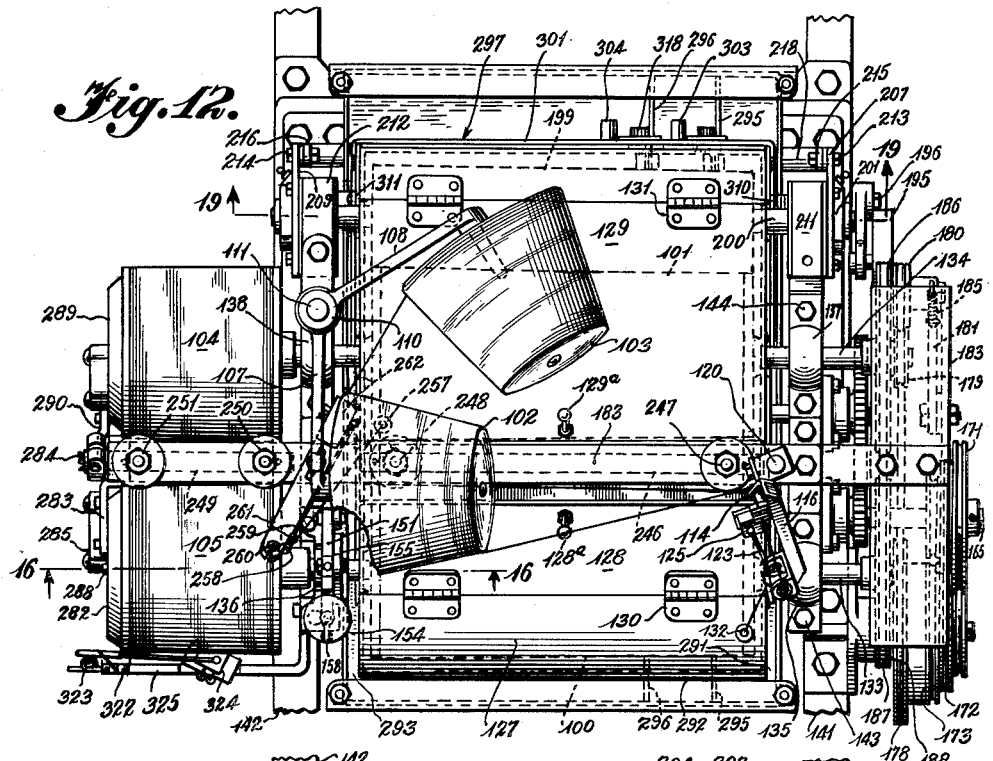
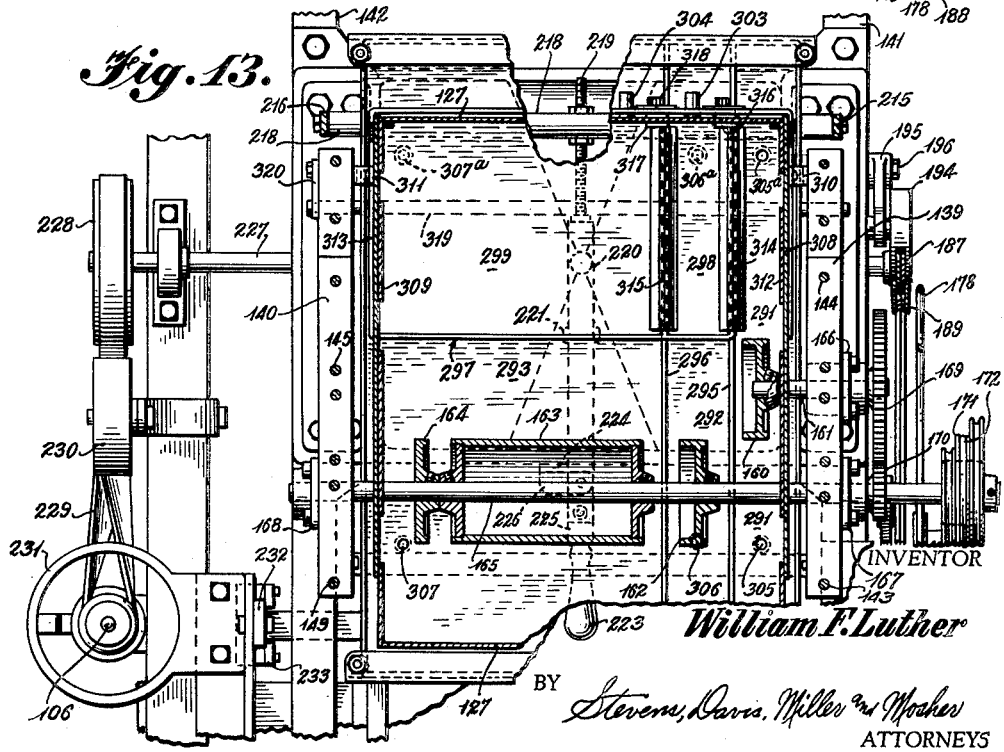

Sept. 14, 1954 W. F. LUTHER 2,688,863
APPARATUS FOR THE CONTINUOUS MERCERIZATION OF COTTON
Filed Oct. 9, 1950 12 Sheets-Sheet 9

INVENTOR
*William F. Luther*

BY *Stevens, Davis, Miller & Mosher*
ATTORNEYS

Sept. 14, 1954 W. F. LUTHER 2,688,863
APPARATUS FOR THE CONTINUOUS MERCERIZATION OF COTTON
Filed Oct. 9, 1950 12 Sheets-Sheet 10
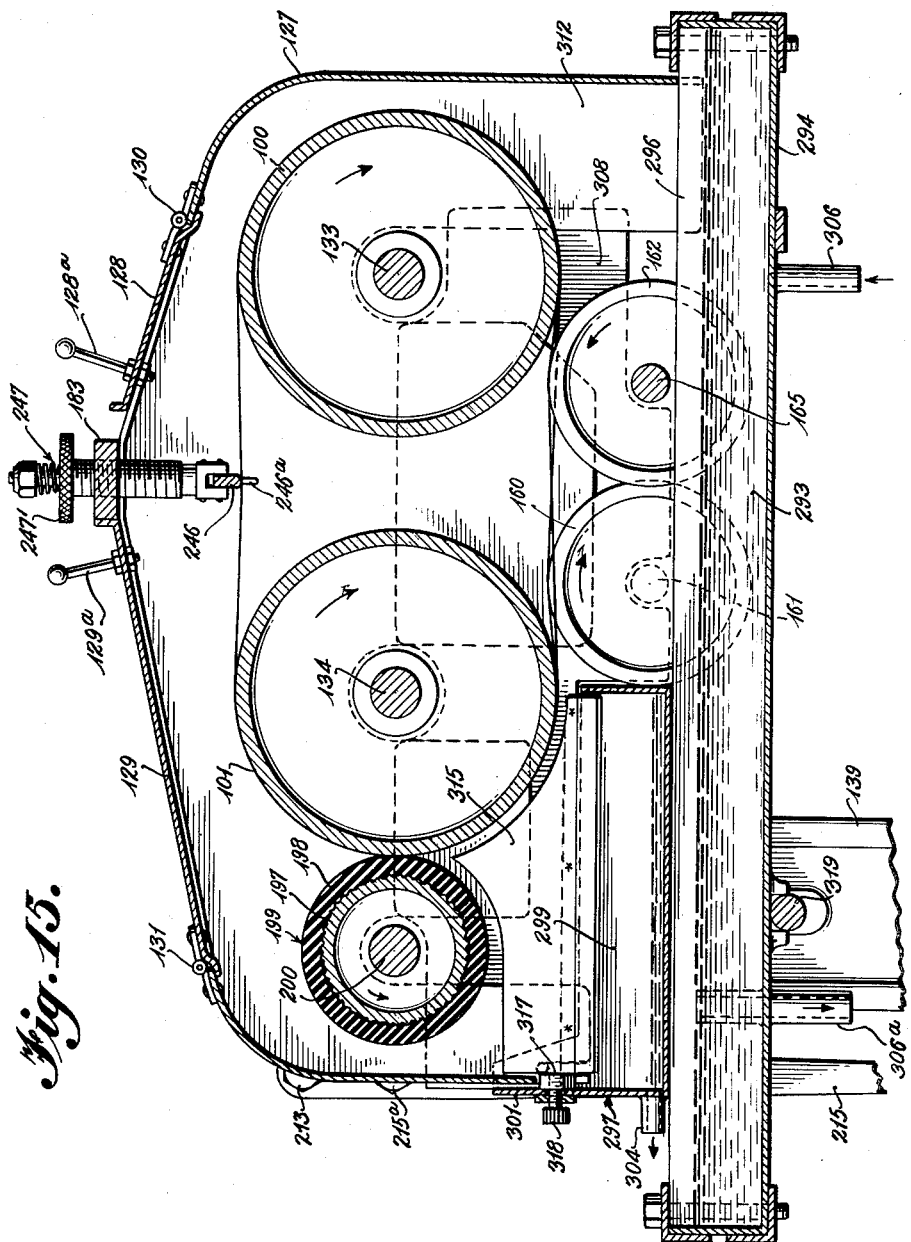
INVENTOR
William F. Luther
BY Stevens, Davis, Miller & Mosher
ATTORNEYS Sept. 14, 1954  W. F. LUTHER  2,688,863
APPARATUS FOR THE CONTINUOUS MERCERIZATION OF COTTON
Filed Oct. 9, 1950  12 Sheets-Sheet 11
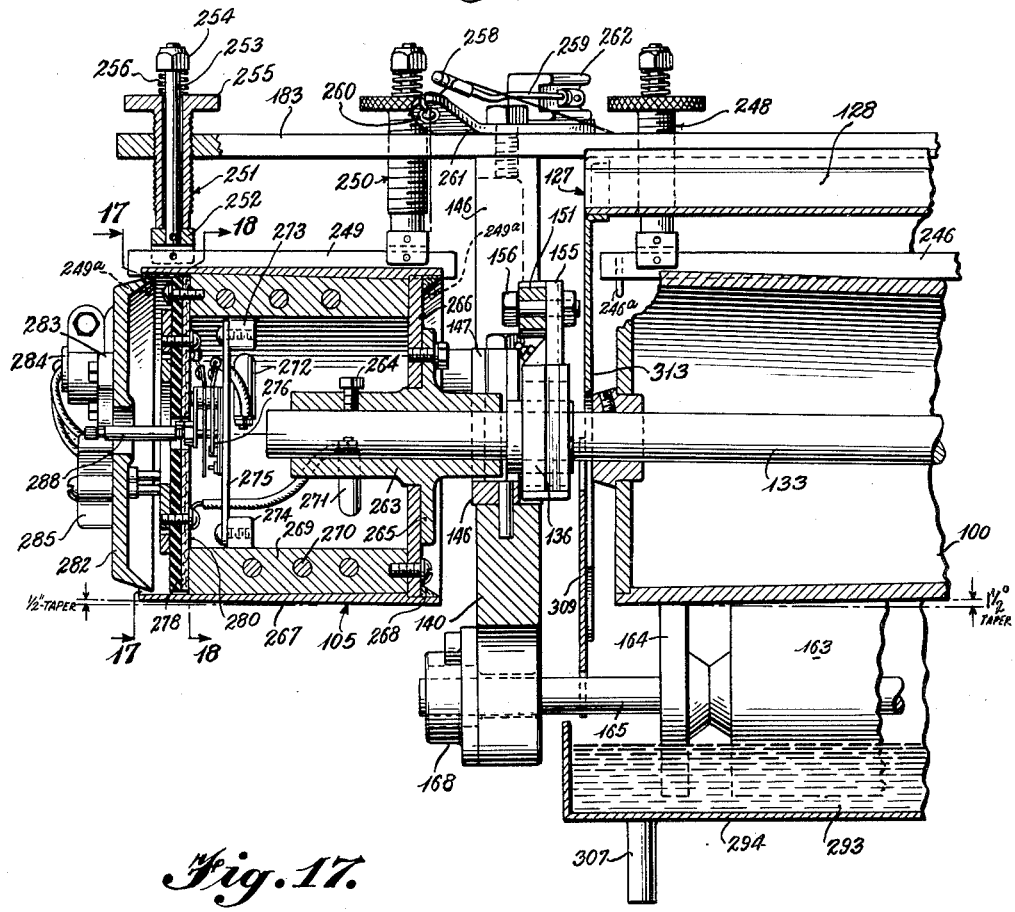
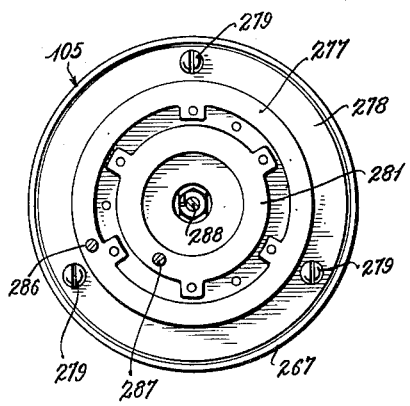
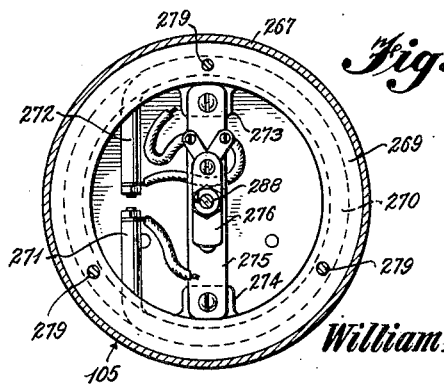
INVENTOR
*William F. Luther*
BY *Stevens, Davis, Miller & Mosher*
ATTORNEYS

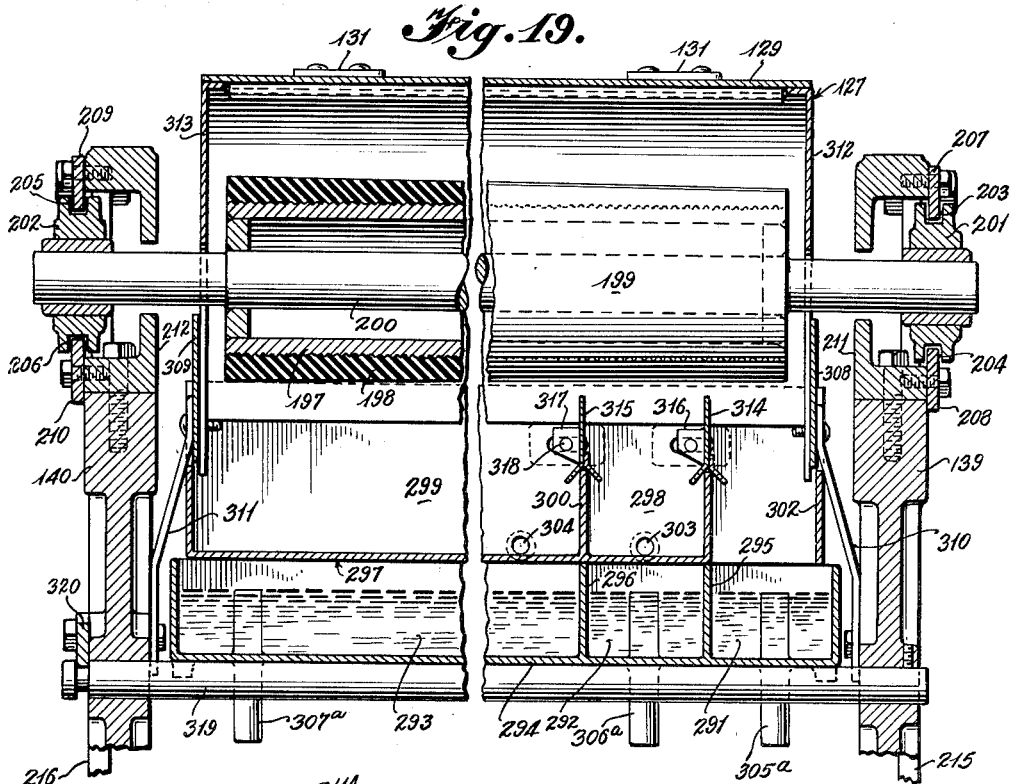
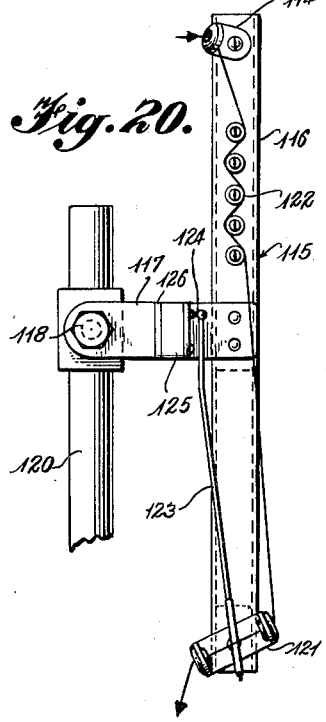
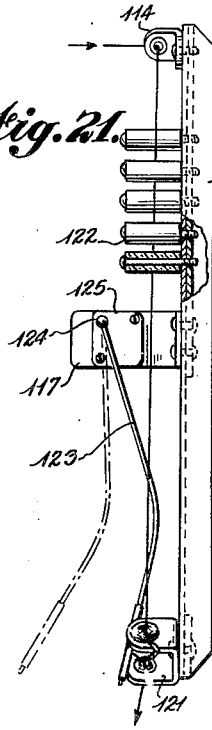
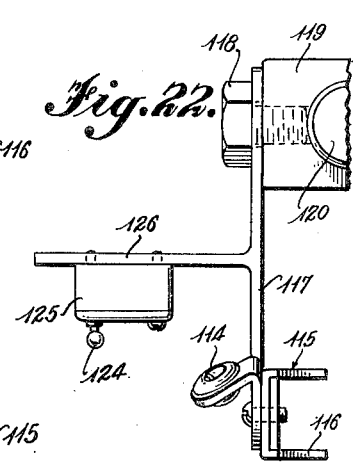

Patented Sept. 14, 1954

2,688,863

UNITED STATES PATENT OFFICE 2,688,863

APPARATUS FOR THE CONTINUOUS MERCERIZATION OF COTTON

William F. Luther, Chattanooga, Tenn.

Application October 9, 1950, Serial No. 189,177

19 Claims. (Cl. 68—22)

This invention relates to mercerization of cotton yarns or threads and more particularly to an apparatus for the continuous mercerization of a single yarn as it is being advanced. The invention is of especial utility for mercerizing two ply yarns.

In the usual apparatus for mercerizing cotton yarns, a large number of yarns, often several hundred in number, are brought together in a bundle or rope and this bundle of yarns is advanced through the mercerizing bath in order to process them. This is generally referred to as the warp process for the mercerization of cotton yarns. The mercerization of yarns in warp form, however, involves certain disadvantages, and in particular it may be mentioned that the yarns are not uniformly mercerized. This is principally because the yarns at the interior of the bundle do not receive the same mercerizing treatment as the yarns at the outside of the bundle, inasmuch as the mercerizing liquid does not come into as free contact with these inner yarns.

In addition, in advancing the yarns in warp form, it is impossible to make certain that all of the yarns are under the same tension throughout the mercerizing process, and this also necessarily brings about a variation in the mercerizing action. Also, in handling two-ply yarns, it has not been possible to apply as great a tension as has been desired, due to the frail character of these yarns and the necessity of making certain that one or more yarns which are under an increased tension are not stretched beyond their breaking strength.

It has consequently been impossible to so closely control the mercerization of the yarns being handled in warp form that a uniformity of treatment results. Because of this the threads have not received uniform dyeing properties and they have not attained their maximum strength or luster.

It is a primary object of the present invention to provide a machine for mercerizing a single yarn strand in such a manner that uniform mercerization occurs throughout the entire length of the yarn. Because of this the yarn has a greater dye uniformity.

Another object of the invention is to obtain the mercerization of yarn under conditions which can be closely controlled so that variations in the mercerization of the yarn can be avoided.

A further object of the invention is to mercerize a single yarn strand at high speed so that although it is being handled in single end form, the process will be economical. Additional economy is achieved due to the elimination of the creeling, warping, splitting, quilling and other winding operations.

A still further object of the invention is to obtain a greater degree of mercerization and to produce a yarn having a greater luster and also a greater strength due to the ability of applying a greater tension without breakage.

Other objects of the invention will appear from the following description when considered in conjunction with the accompanying drawings.

In these drawings:

Figure 1 is a plan view of a machine contemplated by the invention for carrying out the mercerization of a single end of cotton yarn;

Figure 2 is a front elevational view of the machine of Figure 1;

Figure 3 is a sectional view on the line 3—3 of Figure 2;

Figure 4 is an end elevational view as indicated by the line 4—4 of Figure 2;

Figure 5 is a sectional view on the line 5—5 of Figure 2;

Figure 6 is a sectional view on the line 6—6 of Figure 2;

Figure 7 is an elevational view of the rear side of the machine of Figure 1;

Figure 8 is an end elevational view of the machine as indicated by the line 8—8 of Figure 2;

Figure 11 is a rear end elevation of the machine of Figure 9;

Figure 12 is a top plan view of the machine of Figure 9;

Figure 13 is a view in horizontal section taken on the line 13—13 of Figure 11;

Figure 15 is a longitudinal sectional view taken on the line 15—15 of Figure 10;

Figure 16 is a transverse sectional view taken on the line 16—16 of Figure 12 and illustrating the details of the dryers with which the machine is equipped;

Figure 9:
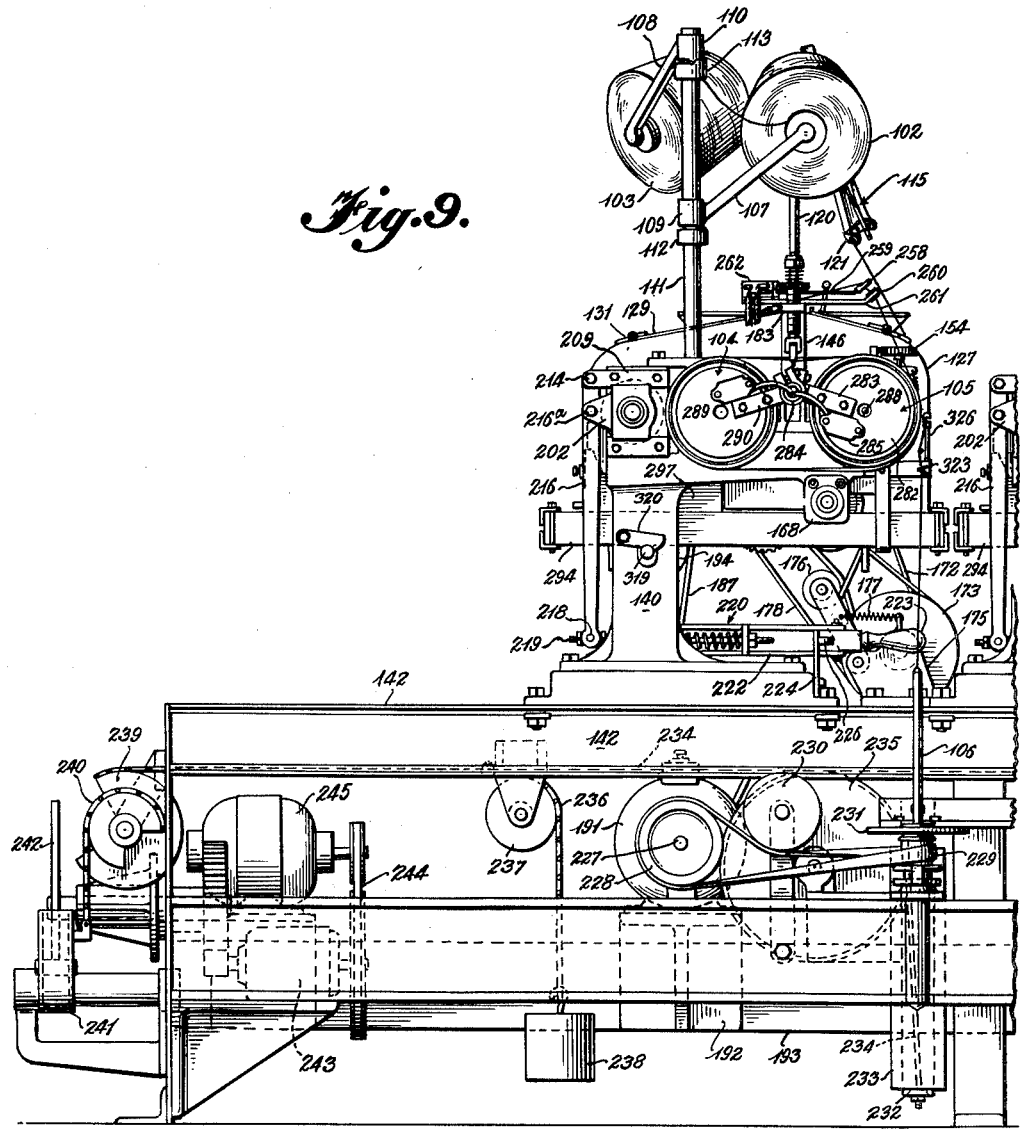
Figure 9 is a view in front elevation of a preferred embodiment of a single end mercerizing machine affording certain structural and operating advantages over the machine shown in Figures 1 to 8, inclusive.
Figure 10:
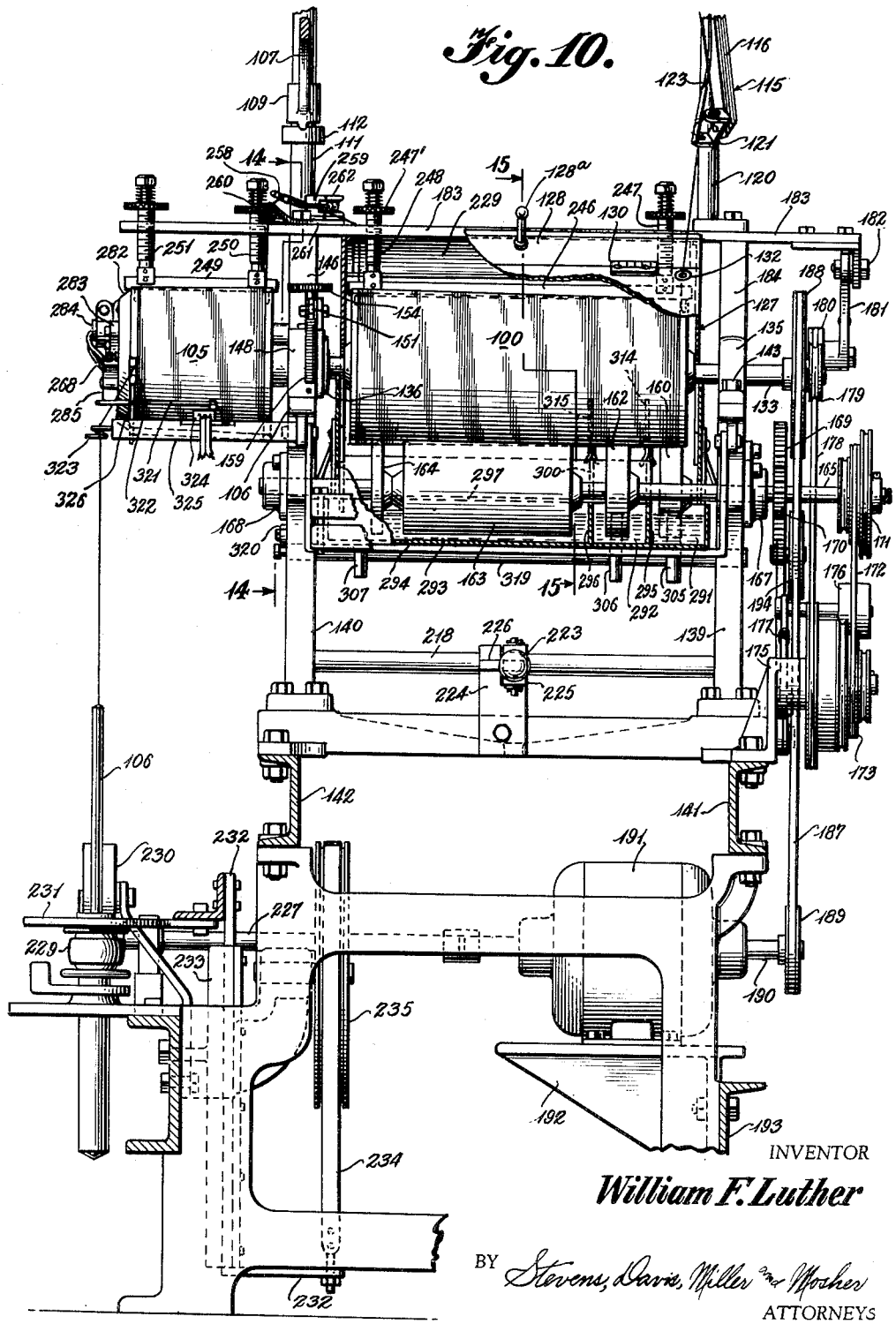
Figure 10 is a front end elevation partially in section of the machine of Figure 9.

Figures 17 and 18 are detailed sectional views taken on the lines 17—17 and 18—18 respectively of Figure 16;

Figure 19 is a transverse sectional view taken on the line 19—19 of Figure 12;

Figures 20, 21 and 22 are detailed views of the pretensioning and guiding device through which the thread passes in its path to the machine; and Figures 23 and 24 are detailed sectional views taken on the lines 23—23 and 24—24 respectively of Figure 11 and illustrating the mechanism for controlling the pressure of the squeeze roller.

The framework for the apparatus of Figures 1 to 8 inclusive includes a pair of spaced horizontal members 11, here shown as angle irons. The members 11 are fastened to a suitable supporting surface, such as an elevated platform or table top which will serve to maintain the members 11 in their proper spaced relationship. Attached to the horizontal members 11 are upright frame members 13 and 14 and, as here shown, these members 13 and 14 are of channel construction in cross-section. The uprights 13 and 14 may be attached to the horizontal members 11 by any suitable means, such as by welding. To brace the upper ends of the upright members 13 and 14 they are connected by a spacing bar 12.

The yarn or thread which is to be mercerized may be supplied from any desired source and preferably it is provided in a package from which it may be readily withdrawn. As here shown, the yarn is in the form of a cone, as shown at 15, and this conical package of yarn is carried upon a horizontally extending arm 13a which is secured to the upright member 13. As it is preferable to withdraw the yarn from such a cone in an axial direction, a pigtail guide 16 is disposed axially above the cone 15 and this pigtail guide is attached to an upright rod 17 which is fastened at its lower end, as by welding, to the upright member 13.

From the pigtail guide 16 the yarn passes forwardly to another pigtail guide 18 which is attached to a rod 19 which projects laterally from and is secured to the upright rod 17. From the pigtail guide 18 the yarn passes downwardly through a tension guide 21 and this tension guide is carried by an arm 22 which is attached, as by welding, to the upright member 13. This tension guide 21, may for example, be of the revolving disc type.

After passing through the tension guide 21, the yarn progresses to one end of a yarn-storage, yarn-advancing device which includes two spaced rollers 23 and 24. The roller 23 is attached to a shaft 25 and this shaft is rotatably mounted in bearings 26 which are fastened to one of the outer faces of upright members 13 and 14. The other roller 24 is attached to a shaft 27 and this shaft is rotatably mounted in bearings 28 which are fastened to the other outer faces of the channeled upright members 13 and 14. The axes of the rollers 23 and 24 are disposed to lie in parallel planes, but their axes are at an angle, or are askew with respect to each other. To adjust this latter angularity between the axes of the two rollers, one of the bearings 26 may be provided with an adjustment as indicated at 29, so that this end of the shaft 25 can be raised or lowered.

Due to the relationship between the axes of rollers 23 and 24, a yarn which is delivered to them will be advanced by them in generally helical turns from the end of the rollers to which the yarn is supplied, to the other end of the rollers. After properly fixing, by means of adjustment 29, the angularity between the axes of the rollers 23 and 24, while maintaining the axes in their parallel planes, the spacing between the generally helical turns can be established. It is desirable that the turns be close together so that a maximum length of yarn will be on the rollers at any time but it is desirable that enough spacing between the helical turns be maintained so that the turns do not overlap.

As here shown, the rollers 23 and 24 are rotated in a counter-clockwise direction when the machine is viewed from Figures 4 and 5. It will be understood that the yarn is withdrawn from the spaced rollers 23 and 24 at their ends to which the yarn is being advanced, at the same rate that it is being supplied to the receiving ends of the rollers plus the amount of stretch produced by the tapered rolls, as will be explained. Thus, the yarn is being continuously advanced to the rollers, is being continuously stored in generally helical turns while being advanced along these rollers and is being continuously withdrawn from the rollers so that it may be collected in package form. While the yarn is being thus progressed along the yarn-storage, yarn-advancing device it is subjected to a mercerizing solution, in a manner which will hereinafter be described.

The shafts 25 and 27 may be rotated in unison in any desired manner. As here shown, they are connected by means of a chain 31 which passes over sprockets attached to the projecting ends of the two shafts 25 and 27. The shafts may be driven in any desired manner as by means of a chain 32 passing over another sprocket 33 on the shaft 27, and this chain 32 may be driven by any prime mover.

To apply the mercerizing solution to the yarn as it is being progressed in closely spaced, generally helical turns along the yarn-storage, yarn-advancing device, a padding roller 34 is provided. This roller 34 is attached to a shaft 35 and shaft 35 is rotatably mounted in bearings 36 which are secured to the outer faces of upright members 13 and 14. The padding roller 34 is rotated by means of a pulley 37 attached to shaft 35. A driving belt 38 passes over this pulley 37 and connects it with a pulley on the shaft 27, see Figures 1 and 4. It is preferable that the pulley 37 be of large size so that the padding roller 34 will turn relatively slowly as this will reduce the tendency of this roller to throw off the liquid on its surface.

The underside of the padding roller 34 dips into the mercerizing solution which is carried in a trough 41. The mercerizing solution may be supplied to the trough 41 by any suitable means as through the supply conduit 42. A sufficient amount of solution must be maintained in the trough 41 so that the constant rotation of the padding roller 34 will carry some of this solution upwardly against the yarn being advanced along the rollers 23 and 24.

It will be observed that the padding roller 34 contacts the helical turns of yarn in their lower span between the rollers 23 and 24. This is preferable to having the padding roller 34 contact the yarn at a point directly on either roller 23 or 24 inasmuch as a more certain contact with the yarn can be established by engaging it at the yieldable portion of the yarn in its movement between the two roller surfaces. Preferably, the roller 34 contacts the yarn just after it leaves the roller 23 in its movement to roller 24.

Also, it will be observed that the padding roller 34 is of narrow width. It has been found that this padding roller 34 need be only so wide as to make certain that the mercerizing solution will be positively applied to and absorbed by every increment of length of the yarn. It has been found that the solution which remains in the yarn will continue the mercerizing action upon the yarn after the yarn passes beyond the padding roller 34. By making the padding roller 34 of this narrow width, it is easier to wash the solution from the yarn inasmuch as an excess of the mercerizing solution will not be present by the time the subsequent washing step is reached. Moreover, there is less loss of the solution by prevention of the excess being squeezed into the subsequent water section.

This washing of the yarn is accomplished by means of a second roller 43, which is attached to the same shaft 35 which carries the padding roller 34. The washing roller 43 dips into a trough 44 containing wash water and the roller 43 serves to carry this wash water upwardly into contact with the yarn. It will be noted that the washing roller 43, like the padding roller 34, contacts the yarn turns in their lower passage between the surfaces of the two rollers where they are out of contact with these rollers 23 and 24. Also, it will be observed that the washing roller 43 is considerably longer than the padding roller 34 to obtain a prolonged washing action and make certain that a major amount of the mercerizing solution is removed from the yarn.

Fresh wash water is continuously delivered to the trough 44 through supply conduits 45. To constantly remove the contaminated wash water from trough 44, an overflow pipe 49 is provided.

The troughs 41 and 44 may, for convenience of manufacture, be formed from a single shallow receptacle which is divided by means of a partition 46 so as to thereby provide these two troughs. These troughs, or the shallow receptacle from which they are formed, may be held in position by any desired means and as here shown, this includes a supporting rod 47 which extends between and is carried by the upper ends of vertical support 48. These supports 48 are attached as by welding to the horizontal frame members 11. An edge of the receptacle constituting the troughs 41 and 44 is merely flanged over to form a lip to rest upon the supporting rod 47.

The other end of each of the troughs 41 and 44, or of the receptacle of which they are made, is supported upon a cross rod 51 and this cross rod passes through aligned openings in horizontal bars 52. These horizontal bars 52 are slightly above the horizontal frame members 11 and are attached as by welding at their ends to the upright frame members 13 and 14. The cross rod 51 is preferably provided with a bent end as shown at 51' to form a handle so that the cross rod may be withdrawn by an endwise movement away from the horizontal bars 52 by which it is carried. This withdrawal of the cross rod 51 upon which the rearward portion of the receptacle constituting the troughs 31 and 44 rests, makes it possible to lower this receptacle below the applying rollers 34 and 43 so that it can be removed from the supporting rod 47 and then withdrawn from the machine.

The troughs 41 and 44 should be large enough to underlie at least a major portion of both rollers, and it will be apparent that they may be of the same depth throughout their length. However, it is preferable that the troughs or the receptacle providing them be of shallow depth except beneath the applying rollers 34 and 43 so that a smaller quantity of the mercerizing solution and of the wash water will be present. To carry out this latter purpose, the receptacle from which the troughs 41 and 44 are formed may merely be a pan beneath the roller 24 and this pan slopes downwardly to the deeper portion beneath the applying rollers 34 and 43.

Inasmuch as a superior mercerization action is obtained if the yarn is stretched during the mercerization reaction and the washing out operation, the rollers 23 and 24 are of gradually enlarging diameter from their yarn receiving ends to their yarn discharging ends. As the yarn turns progress along these tapered rollers, the yarn is subjected to an increasing degree of stretch and this imparts a greater luster and strength to the yarn.

It is desirable that a squeeze or wringer roller bear against one of the yarn-advancing rollers 23 or 24 to remove excess solution or water from the yarn so that these liquids will not be thrown away from the machine. To effect this result, a squeeze roller 53 is provided and it is rotatably mounted upon a shaft 54. Shaft 54 is rotatable in arms 55 which are fixed to and project from a rock shaft 56. The rock shaft 56 is rotatable within upright arms 57 which are attached at their lower ends to the horizontal frame members 11. It may be noted that the rear ends of the horizontal bars 52 are secured to upright arms 57 for strengthening purposes, see Figure 6.

To press the squeeze roller 53 against roller 24, a lever arm 58 is attached to the rock shaft 56 and to the free end of the lever arm 58 may be suspended weight 59. It is evident that the downward force of the weight 59 will tend to rock the shaft 56 and forcibly bring the squeeze roller 53 against the yarn-advancing roller 24. By varying the magnitude of the weight at 59, the pressure exerted by squeeze roller 53 can be regulated.

The squeeze roller 53 should be as long as the yarn-storage, yarn-advancing device so that all of the yarn turns thereon will be subjected to the wringing action of the squeeze roller. As has been noted, the applying rollers 34 and 43 preferably are beneath the roller 23 so that these applying rollers deliver their respective liquids to the yarn immediately after it leaves the roller 23 in its movement toward the roller 24. As the squeeze roller 53 bears against the roller 24, the liquids applied by the padding roller 34 and washing roller 43, have an appreciable amount of time to come into contact with the yarn to make sure that the yarn is adequately treated before it is subjected to the wringing action of squeeze roller 53.

The mercerizing solution which is pressed from the yarn after having been applied to the yarn by roller 34, drops down into the shallow, rearward part of trough 41 and flows to the deeper part of the trough. Since this returned solution is reapplied to the yarn, the mercerizing solution is conserved.

Inasmuch as the wash water which is squeezed from the roller 24 by means of the roller 53 contains some of the mercerizing solution, and it is therefore of value, the invention contemplates the recovery of this removed liquid. To accomplish this, a catch pan 61 is located beneath the thread-advancing roller 24 in such position that the liquid squeezed out of the yarn by roller 53 above this catch pan 61 will be collected in the pan. This recovered liquid can be continuously removed from the catch pan 61 by means of a drain conduit 62, see Figure 5, and this recovered liquid may be reconcentrated for reuse.

The catch pan 61 may be supported by merely fastening it in place upon the bottom of the receptacle providing the troughs 41 and 44. As here shown, the catch pan 61 extends to the end of roller 24 from which the yarn is delivered and consequently all of the wash water which is squeezed out by roller 53 is recovered. However, the catch pan 61 can be shortened so that only the initially applied wash water is collected, so that only the stronger solution will drop into the pan 61. Thus, the concentration of the diluted caustic liquor which is recovered, may be controlled by varying the length of the catch pan 61.

Inasmuch as liquid may accumulate at the point of contact between roller 53 and roller 24 and be carried by the yarn to the takeoff end, it may be desirable to surround this end with a shield 63. This shield 63 may be supported by attaching it to the arms 55 which rotatably support the shaft 54. From the shield 63, the liquid runs down into trough 44.

After leaving the yarn-storage, yarn-advancing device which includes the rollers 23 and 24, the yarn passes through a pigtail guide 64. This guide 64 is carried by a bracket 65 which is attached to one of the upright arms 57. From the guide 64 the yarn passes over a universal winding cam roller 66 and rests in the groove in this cam roller 66. The cam roller 66 is attached to a shaft 67 and this shaft is rotatably mounted in bearings 68 which are secured to the upright frame members 13 and 14, see Figure 2. To rotate the shaft 67 a pulley 69 is fastened thereto and this pulley is driven by means of a belt 70 which also passes around a driving pulley 71. The driving pulley 71 is secured to shaft 27.

A collecting spool or tube 73 is frictionally mounted upon a rotatably mounted arbor 74 which is carried at one end by a swinging arm 75, and this swinging arm 75 is pivotable about a fixed pin 76 projecting laterally from the upright frame member 14, see Figure 2. It is preferable that the collecting spool be in the form of the usual tube having perforations therethrough so that the yarn which is collected on this spool may be further washed and scoured and otherwise finished by passage of liquid through the opening in the tube and radially through the package of yarn. The winding tube or spool may be mounted upon the arbor 74 by merely passing it over the free end of this arbor, and the winding tube or spool can then be moved downwardly against the surface of the winding cam roller 66 under the influence of its own weight, see the broken line position of the tube 73 in Figures 2 and 7.

Rotation of the winding cam roller 66 by means of the belt 70 will, in known manner, serve to frictionally rotate the winding tube or spool 73 so that the yarn delivered thereto will be collected upon this tube or spool. Also, this yarn which is collected upon the spool or tube 73 will be advanced from end to end thereof in building up the package by the action of the cam groove in roller 66.

Rotation of the rollers 23 and 24 will cause the turns of yarn thereon to advance in regular order, but it has been found that by bringing to bear a tensioning rod upon the yarn in its passage between the rollers the yarn will advance with the loops in closer proximity without entanglement. As here shown, this tensioning rod has a horizontal portion 77 which bears upon the upper run of the yarn passing between the rollers 24 and 23. To assure passage of the yarn beneath the tensioning rod 77, its entrance end may be upwardly turned at 78. The other end of the rod is turned upwardly as shown at 79 to serve as a hanger or support. This vertical portion 79 is adjustably attached to a bracket 80 projecting from upright member 14. The end at 78 of tensioning rod 77 is supported by a vertical rod 81 welded at its lower end to rod 77, and attached by adjustment collar 82 at its upper end to cross rod 12.

By adjusting this rod 77 up or down at either end, the yarn loops are kept from separating or shifting in an unruly manner on the rolls. This prevents entanglement or breakdown of the yarn and also allows more loops to be put on the rollers. The fact that more loops can be accommodated on the rollers 23 and 24 if the tensioning rod 77 is employed, means that the mercerization process is speeded up for a given length of rolls. The tensioning rod also serves to remove and lay the fuzz or projecting fibers on the yarn, giving a yarn of smoother appearance and higher luster.

It will be realized that the path of the thread between the rollers 23 and 24 is not truly helical due to the fact that the rollers are spaced apart horizontally as can be clearly seen in Figure 1. Thus, if the angular disposition of the rollers 23 and 24 is such as to produce a helix angle equal to the diameter of the thread, it is still not possible to close up the space between adjacent coils running on the machine. This is due to the fact that the thread which defines the helix extends beyond the cylindrical surface of one roller to get to the other roller which is horizontally spaced from the first. This projection interrupts the formation of a true helix and causes some spacing of the coils of thread even when the relative inclination of the rollers has been reduced to a minimum. On the other hand, the squeeze roller is less effective in its operation if there are spaces between the coils of thread on which it bears. This is because the roller bears on the threads and not on the actual surface of the roller 24. The tensioning bar 77 can be used to overcome this difficulty by disposing it at an angle such that the thread coils bearing against the under surface of it are caused to progress toward the thread receiving end of the device and so to contact the next adjacent coil in that direction. This results in the maintenance of a solid thread body on the device which can and does enhance the effectiveness of the squeeze roller 53.

To make certain that the yarn is delivered to the roller 23 at a uniform point, a guide arm 83 may have its free end disposed close to this roller at the point where the yarn initially contacts the roller. This guide arm 83 is supported by fastening it to the upright frame member 13. A similar guide arm 84, attached to upright member 14, is close to the delivery end of rollers 23 and 24 to prevent the yarn turns from accidentally passing off the ends of these rollers.

Although it is believed that the operation of the apparatus will be clear from the foregoing description, a summary of this operation may here be set forth. In setting the machine into operation the yarn is partly withdrawn from the cone 15 and after passing it through eyes 16 and 18 and tension guide 21, it is passed around the rollers 23 and 24 a few times and the free end is preferably tied to an adjacent turn. Rotation of the rollers 23 and 24 will cause this initial turn to advance axially these rollers and in so moving the yarn will be formed in closely spaced turns throughout the entire length of the rollers.

When the initial few turns have reached the far end of the rollers 23 and 24 the yarn is withdrawn and passed around the collecting spool or tube 73 and this spool is then brought into frictional engagement with the winding cam roller. Thereafter, continued driving of the machine will serve to withdraw the yarn continuously from the supply cone 15 and advance it along the yarn-storage, yarn-advancing device, 10 during which time it is subjected to the action of the mercerizing solution and then to the action of the wash water, and thereafter the yarn is collected upon the spool 73.

The loops are almost instantaneously wet out by the mercerizing solution and the contained mercerization penetrant, which is applied by the padding roller 34 and this wetting is greatly aided by the pressing action of the squeeze roller 53. After the loops pass the padding roller 34, they contain only somewhat more than their weight of the mercerizing solution and the mercerizing action continues until the yarn reaches the water applying roller 43. The rate of washing the yarn is greatly increased by a well-fitting squeeze roller 53. The wet yarn leaving the rollers 23 and 24 will contain approximately equal its weight of water and from 1 to 2% of its weight of the mercerizing solution. The wet yarn is collected upon the perforated spool 73 in which form it is finished and dried before being wound onto cones for shipment.

Any suitable mercerizing solution may be used and this may be a caustic solution of about 30° Baumé. The mercerizing solution should also preferably contain a suitable penetrant or mercerizing assistant, such as Tergitol 08 and a defoaming agent, such as octyl alcohol.

One operating form of the machine contemplated by the invention has yarn-storage, yarn-advancing rollers which are twelve inches long, and are 5.83 inches in diameter at the small end, increasing to 5.98 inches at the large, or take off, end. This gives a pitch of approximately 3% which in turn gives a yarn stretch of 3%. The padding roller 34 is ½ inch wide and is set in approximately ¼ inch from the thread receiving end of the yarn loops to prevent caustic migrating to the end of the rollers and flying off. There is a space of approximately three and one-half inches left between the caustic padder 34 and the water applying roller 43. The yarn may be handled by this machine at a rate of 400 yards per minute, or better, which means that the yarn is mercerized in approximately 60 seconds.

The short period of time in which the yarn is mercerized according to the process of this invention may be accounted for by the fact that the yarn is repeatedly subjected to the application of the mercerizing liquid and to the wringing action of the squeeze roller. The repetition of these successive treatments serves to bring about a more thorough penetration of fresh mercerizing solution into the yarn. Thus, the padder-squeezer roll combination speeds up the process by bringing about a quicker and more thorough penetration of the fresh mercerizing solution, followed by quick displacement of the caustic in the washing step.

If now reference is made to Figures 9 to 24, inclusive, it will be observed that the machine there shown differs from the machine of Figures 1 to 8, inclusive, in several important respects. In the first place, the apparatus of Figures 9 to 24 is intended for commercial installation and hence is a multi-unit machine with provision in each unit for continuous feeding of the yarn to be mercerized, continuous mercerization of the yarn, continuous drying of the mercerized yarn and continuous twisting of the dried mercerized yarn. Other differences and developments over the machine shown in Figures 1 to 8, inclusive, will be apparent as the description of the machine of Figures 9 to 24 proceeds.

It will be noted that each unit of the machine of Figures 9 to 24, inclusive, is comprised of two thread-storage thread-advancing rollers or cylinders 100 and 101. The yarn to be mercerized is drawn first from a wound package 102 and then from a wound package 103 onto the rollers 100 and 101. After passing over the rollers 100 and 101 in a plurality of closely spaced generally helical turns, the mercerized and washed yarn is passed in generally helical fashion over rollers 104 and 105 on which it is dried. The dried yarn issuing from the rollers 105 is led to a bobbin on spindle 106 of a ring twister and is collected thereon.

The wound packages 102 and 103 which comprise the yarn to be mercerized are mounted on spindles or studs which project from supporting arms 107 and 108, respectively. The supporting arms 107 and 108 are connected at their respective ends remote from the package supporting spindle to collars 109 and 110 and these collars are a loose fit on a standard 111 supported from the main frame of the machine. Each collar 109 and 110 is provided with a downwardly projecting ridge on its lower surface and that ridge seats in a radial groove in the upper surface of the appropriate collar 112 or 113, the collars 112 and 113 being fixed on the standard 111. By this arrangement is is possible to support the two frusto conical packages 102 and 103 for overhead withdrawal with the small end of each directed toward a common thread guide 114. Thus by tying the inner end of package 102 to the outer end of package 103 it is possible, upon the exhaustion of package 102, to withdraw overhead package 103 without interrupting the continuity of the operation. While yarn is being withdrawn from package 103 an operator swings the arm 107 out of position, by raising it enough so that the collar 109 is disengaged from the collar 112, and puts a new package on the spindle. He then swings arm 107 back to position and ties the outer end of the yarn to the inner end of the yarn constituting package 103. Thus the yarn packages 102 and 103 are alternately replenished to maintain an uninterrupted supply of yarn moving to the mercerizing unit. The radial ridges on the lower edges of the collars 109 and 110 coacting with the radial grooves on the upper surfaces of collars 112 and 113, respectively, permit easy swinging of the arms 107 and 108 for package replenishment and yet accurate return of each to its predetermined position with respect to the thread guide 114.

So that the yarn will be drawn onto the rollers 100 and 101 under uniform tension, the thread guide 114 which lies intermediate the packages 102 and 103 and the roller 100 is associated with a tensioning or drag imparting mechanism generally designated by the numeral 115 and shown in detail in Figures 20, 21 and 22. The thread tensioning mechanism includes a supporting channel member 116 which is centrally held from a bracket 117 which in turn is attached by a bolt 118 to a collar 119 which surrounds a supporting standard 120.

It can be seen that the actual position of the channel member 116 is adjustable since by loosening bolt 118 the angular position of collar 119 or the standard 120 and the angular position of the bracket 117 may be altered to suit operating requirements.

At the end of the channel member 116 remote from the guide 114 there is located a guide 121 which is in the form of an inverted U with both shanks having porcelain eyelets. The guide 121 and the guide 114 are both bolted to the channel member 116 and by loosening the bolts, the angular position of the guides may be altered. Between the guide 114 and the point of attachment of the bracket 117 to the channel member 116, there are located a plurality of porcelain tensioning fingers 122 arranged in a line lengthwise of the channel member 116 and spaced apart enough to define between guide 114 and guide 121 a tortuous path.

It has been explained that the guide 121 is an inverted U member having thread eyelets in both of its shanks. In between the shanks of the guide 121, there is located a stop motion wire 123, which is resiliently urged to swing in a clockwise direction as it is viewed in Figure 21. When the thread is running normally in the machine, it holds the stop motion wire 123 in the full line position of Figure 21, but in the event of thread breakage, the wire moves to the broken line position of Figure 21 and in so doing actuates a switch which disconnects power to the driving mechanism for the rollers 100 and 101. To this end, the stop motion wire 123 is pivotally mounted on a pin 124 which projects from a switch box 125 which is affixed to a secondary bracket 126 extending out at right angles from the bracket 117. By mounting the switch box 125 from the bracket 117, the adjustments of the bracket 117 which may be necessary to the proper positioning of the channel member 116 are accomplished without disturbing the relative position of the stop motion wire 123 to the thread guide 121.

The yarn issuing from the thread guide 121 passes directly to the mercerizing roller 100. It will be observed, however, that the mercerizing rollers 100 and 101 are covered by a protective hood 127 which is provided with doors 128 and 129, having operating handles 128a and 129a thereon. The doors 128 and 129 are connected by hinges 130 and 131, respectively, to the main hood 127, so that the doors may be raised to render the thread storage-thread advancing rollers and their associated mechanisms available for inspection or repair. So that the movement of the door 128 will not interfere with the thread running between the thread guide 121 and the roller 100, an eyelet 132 is provided in the hood 127 adjacent but not in the path of the door 128.

The rollers 100 and 101 are provided with shafts 133 and 134, respectively, which are mounted in bearings 135, 136, 137 and 138. These bearings are supported on L-shaped frame members 139 and 140 which are supported from channel beams 141 and 142 which run for the length of the machine and support not only the frame members 139 and 140 but also similar frame members for the other units of the machine. Bearing 135 is the rear bearing for the shaft 133 and is held in fixed position on the frame 139 by bolts 143 best seen in Figures 10 and 11. Bearing 137 is the rear bearing for the shaft 134 and is held in fixed position on the frame 139 by bolts 144 best seen in Figure 11. Bearing 138 is the front bearing for the shaft 134 and is held in fixed position on the frame 140 by bolts 145 as can best be seen in Figure 14.

Since it is intended that the rollers 100 and 101 act as yarn-storage, yarn-advancing devices, it is necessary that the axis of one of them be askew with respect to the axis of the other. Since bearings 135, 137 and 138 are fixed, the deviation of the shafts 133 and 134 from perfect parallelism is brought about by rendering adjustable the position of bearing 136. In view of the fact that shaft 133 is adjustable, the bearings 135 and 136 are of the self-aligning type to maintain the shaft concentric in the bearings despite adjustment of the bodily position of bearing 136.

Figure 14:
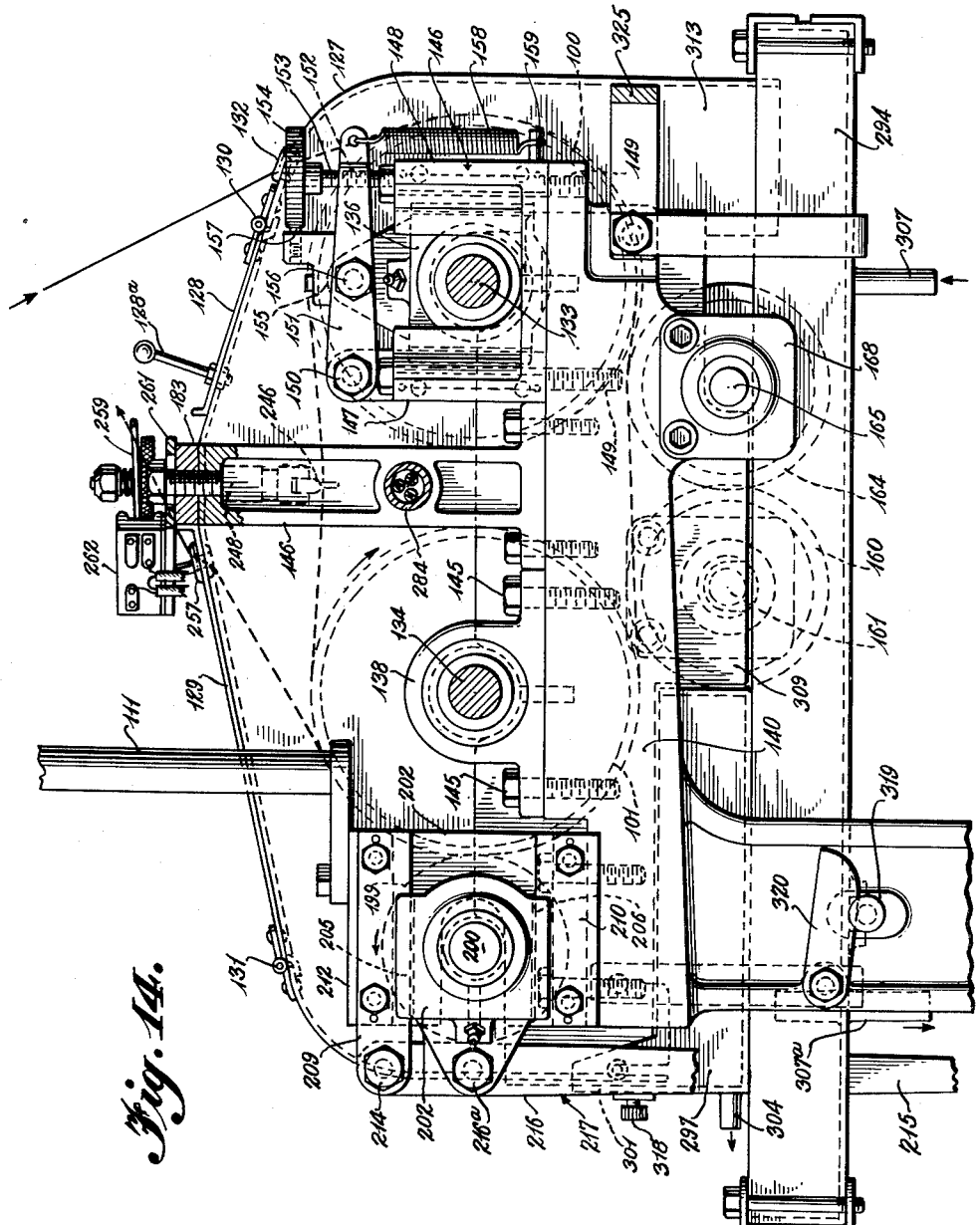
Figure 14 is a longitudinal sectional view taken on the line 14—14 of Figure 10.

Upon reference to Figures 14 and 16, it can be seen that bearing block 136 is generally rectangular as viewed in elevation and block 136 is mounted for vertical sliding in a key way defined by the upright shanks 147 and 148 of an inverted U-member 146 which is connected to the frame 140 by bolts 149. The shank 147 has pivoted to its upper end at 150 a bearing position control lever 151. The other end of this lever is internally threaded at 152 and through the threaded portion passes a threaded stud 153 provided with an operating knob 154. The stud 153 rests against an upper surface of the shank 148 and is rotatable relative thereto. It can now be seen that by rotating the stud 153, the lever 151 can be pivoted to a limited extent about the bolt pivot at 150.

So that small angular displacement of the lever 151 will bring about small vertical movement of the bearing block 135, the latter is provided with an upwardly projecting flange 155 which is pivotally connected by a bolt 156 to the lever 151 at a point between the pivot 150 and the stud 153.

The magnitude of the adjustment of the stud can be audibly determined by using a clicking detent 157 in association with the knob 154. A spring 158 acts in tension between the end of the lever 151 and a projection 159 extending from the U member 146. This spring serves to seat the threaded stud 153 so that it is not necessary to mount it for rotation within one of the shanks of the U member 146.

It will be noted that the rollers 104 and 105 which are used for drying the mercerizing yarns are mounted cantilever fashion on those ends of the shafts 134 and 133, respectively, which project through the bearing blocks 138 and 136, respectively. Thus, the angular disposition of the shaft 133 relative to the shaft 134 adjusts not only the askew relation of rollers 100 and 101 but likewise and to the same extent the askew relation of rollers 104 and 105.

It has been stated that the yarn is drawn from the packages 102 and 103 onto the rollers 100 and 101 through intermediate thread guides which have already been described. Before undertaking a description in detail of the driving mechanism for the two rollers 100 and 101, it is desirable to refer briefly to other driven parts of the machine so that in describing the driving mechanism all of it may be explained as a unit.

In connection with Figures 1 to 8, inclusive, padding rollers and a washing roller were described as driven parts. These features are incorporated in the machine shown in Figures 9 to 24, inclusive, but their particular arrangement, shape and operation is somewhat different from the modification described in Figures 1 to 8, inclusive. In the first place, the padding roller which applies the caustic is not mounted coaxially with the washing roller, as was the case in the embodiment of Figures 1 to 8, inclusive, but is separately mounted cantilever fashion in a slightly different position. If reference is made to Figure 13, it will be noted that the padding roller 160 is mounted on a stub shaft 161, whereas wash rollers 162, 163, and 164 are mounted in spaced relation on a separate shaft 165. The bearing 166 for mounting shaft 161 is connected to the frame 139 by bolts and similar bearings 167 and 168 are attached respectively to the frame members 139 and 140 in a manner to support the shaft 165. The shaft 161 is provided with a gear 169 through which it is driven and this gear meshes with a gear 170 mounted on the shaft 165. Also mounted on the shaft 165 in axially spaced relation to the gear 170 is a triple conical sleeve 171 provided with belt grooves at various radii to constitute part of a driving speed adjustment mechanism. The sheave 171 is connected by a belt 172 to a quadruple conical sheave 173 which is mounted on a shaft 174 journaled in a block 175 attached to the frame channel member 141. A belt tightener 176 (see Figure 11) is pivoted to a bracket extending from the journal block 175 and is urged by a spring 177 to tighten the belt 172. The sheave 173 is driven by a belt 178 which in turn is driven by a pulley 179 attached at the outside end of the shaft 134. In order to tighten the belt 178, the reversal loop of the belt passes around a pulley 180 which is carried on an arm 181 pivoted at 182 to a frame element 183 attached to a standard 184 extending upwardly from the L-frame 139. Pulley 180 is urged to belt tightening position by a spring 185 running between the arm 181 and an end of the frame 183.

The shaft 134, in addition to carrying thereon the pulley 179, likewise carries a pulley 186 which is connected by a belt 187 to a similar pulley 188 fixed on the shaft 133. The belt 187, in addition to engaging the two pulleys 179 and 188, likewise surrounds a pulley 189 that is connected to a shaft 190 of an electric motor 191 mounted on a bracket 192 attached to a main frame 193 supported from the floor. The belt 187 is maintained tight by a rider pulley 194 attached to an arm 195 which is pivoted at 196 to a portion of the frame 139.

It will be observed that the pulleys 186 and 188 are the same size and that in view of the way in which the belt passes around them they will both be turned at the same speed in a counter-clockwise direction as viewed in Figure 11. Since the pulley 179 is much smaller than either of the pulleys 186 or 188, the belt 178 will be driven more slowly than the belt 187. Further speed reduction is brought about by the large diameter of pulley 173 such that the speed of shaft 174 is below that of shafts 133 and 134. Shaft 172 is shown as connected in such a way that the speed of shaft 165 is about equal to that of shaft 174. On the other hand, the gears 169 and 170 are of such relative size that the padding roller 160, which is driven from the shaft 161, will move much slower than the washing rollers 162, 163 and 164. Furthermore, it will be observed that the lower run of the yarns from the roller 100 to the roller 101 is from left to right as viewed in Figure 11. From that figure it is likewise apparent that the upper surface of washing rollers 162, 163 and 164 at the point of tangential contact with the threads move in the same direction as the threads in their lower run whereas, by virtue of the reversal brought about by the gears 169 and 170, the padding roller 160, which applies the mercerizing caustic, will, at its upper surface where it tangentially contacts the thread, be moving in a direction opposite to the direction of the thread.

The nature and speed of the movements of the several driven parts of the mercerizing and drying apparatus have now been described and there remains the necessity of describing the structure and mounting arrangement for the squeeze roller and the structure and operation of the twisting mechanism. For an understanding of the squeeze roller, reference should be made to Figures 14, 15 and 19. The squeeze roller itself is comprised of a hollow metal cylinder 197 having a longitudinally knurled surface over which there is fit a tight resilient sleeve of rubber which is designated in the drawings at 198. The resilient sleeve 198 should be made of natural or synthetic rubber having a Shore hardness of 50 to 70. The squeeze roller, which may be generically designated by numeral 199, is mounted on a shaft 200 and that shaft is journaled in bearing blocks 201 and 202. The bearing blocks 201 and 202 are provided with upper and lower horizontal grooves at 203, 204, 205 and 206 and these grooves receive therein guiding rails 207, 208, 209 and 210. The guiding rails are attached by bolts to generally U-shaped brackets 211 and 212 and the brackets are in turn bolted respectively to frame members 139 and 140. It can be seen that by the arrangement shown the bearing blocks 201 and 202 are slidable horizontally on the respective rails and that sliding movement thereof will bring about an adjustment of the spatial relation between the squeeze roller 199 and the adjacent treatment roller 101. So that this adjustment may be conveniently effected, the upper rails 207 and 209 for the bearing blocks 201 and 202 are extended beyond the end of the bearing block and are provided there with bolts 213 and 214 which pivotally connect them to depending arms 215 and 216 which are connected together at their lower ends by a rod 218 which extends across the machine from the lower end of the arm 215 to the lower end of the arm 216. Arm 215 is pivotally connected at 215a to the bearing block 201 and arm 216 is similarly connected to the bearing block 202 at 216a. At the midpoint of the rod 218, see Figure 13, it is connected to a threaded bolt 219 which extends from within a rectangular frame defining a cross-head slide assembly 220. Slidable on the slides of the assembly 220 is a cross-head 221 to which the threaded rod 219 is anchored. Between the cross-head 221 and the right hand end of the cross-head slide assembly as it is viewed in Figure 11, there is a compression spring 222 which urges the cross-head 221 and the rod 219 toward the left and the end of the cross-head slide assembly 220 toward the right as viewed in Figure 11, thereby to shorten the effective length of the assembly 220 and the rod 219. The assembly 220, see Figures 13 and 23, is provided with a handle 223 by which it may be moved into and out of latching engagement with a bracket 224. Actually, the handle 223 is screwed into a block 225 which is pinned between the slides of the assembly 220 at the end remote from the rod 219. The block 225 has pivotally attached to it a boss 226 which extends transversely of the long axis of the handle 223 and which bears against the surface of the bracket 224 to assume the thrust of the spring 222.

When it is desired to move the squeeze roller 199 away from the roller 101, the handle 223 is moved to the right of the position of Figure 13 until the boss 226 no longer engages the bracket 224 and the whole assembly 220 and 219 can be moved to the right of the Figure 11 position to cause the bearing blocks 201 and 202 to move away from the machine. Note that the bracket 224 is slotted to receive the slides of the assembly 220, see Figure 23.

It has been stated above that the yarn issuing from the drying roller 105 is twisted on spindle 106. The spindle 106 is driven by a shaft 227 which is connected to the drive shaft 190 of the motor 191 on the opposite side of the motor from the connection of the pulley 189. The shaft 227 is provided at its end remote from the connection to the motor 191 with a driving pulley 228 which is connected by a belt 229 to the driving pulley for the spindle 106. A belt guide 230 serves to maintain the belt in its desired driving relation to the spindle 106.

The details of the spindle 106 are well known to the art and need not therefore be described in detail here. The spindle 106 is a part of a ring twister which includes, in addition, a ring frame 231 on which is mounted a traveler that lays up the yarn on the spindle. In order that the yarn may be laid up in successive courses according to a pattern, it is necessary to reciprocate the ring frame 231 and to this end it is connected to a vertically extending bar 232 which is guided for reciprocation in a trackway 233 suitably attached to the main frame, see Figures 10 and 13. The bar 232 is connected at its lower end to a tape 234 which extends around a large builder pulley 235 to a chain 236, see Figures 9 and 10. The chain 236 passes around a pulley 237 and is provided at one end with a counterweight 238 and at the other end is connected to a wheel 239 which is oscillated by a chain 240 connecting it to a cam follower 241. The cam follower is oscillated about its axis by a heart-shaped cam 242 which is driven from a motor 243 through a belt drive 244 and a transmission including a gear box 245. It is to be understood that the details of the driving mechanism for operating the ring rail are only schematically indicated since this type of arrangement is well known in the art and per se forms no part of this invention.

The actual transmission of the thread from the package 102 or 103 to the bobbin on the twister spindle has now been described. It is to be understood, however, that the control of the spacing of the coils of the yarn on the rollers 100, 101, 104 and 105 has not been described, nor has the guiding arrangement for transferring the yarn from the pair of rollers 100 and 101 to the pair of rollers 104 and 105.

It will be understood that no matter how bearing 136 is adjusted the helix angle of the coils wound on the rollers 100 and 101 can never be such as to make the yarns run over both rollers in contacting relation to define virtually a sheet. The reason for this is that the rollers 100 and 101 are spaced apart, and if the helix angle be adjusted to equal the thickness of the thread, even so, some divergence will occur in the run between the tangential discharge from one roller to the tangential take up of the other. It is, however, desirable that as much thread as possible be maintained on the rollers 100 and 101 during mercerizing and that that thread be run in the form of coils that are so closely spaced as to be virtually touching. To accomplish this result it is necessary to push the coils backwards of their axial advancement during a run between the rollers. This is accomplished by a bar 246 which is disposed in the yarn path of the upper run of yarn between the two rollers 100 and 101. The angularity of the bar 246 is adjustable by screws 247 and 248 that are threaded through the frame element 183 which extends across the top of the machine and which is suitably supported from standards 146 and 184.

A similar bar 249 acts between the rollers 104 and 105 and this bar is adjusted by screws 250 and 251. The screw 251 is shown in section in Figure 16 and that screw will be described in detail with the understanding that the same structure is employed in the screws 247, 248, 250 and 251.

Referring now in detail to the screw 251, it will be seen that it is a hollow threaded body, the lower surface of which bears on the upper surface of a boss 252. The boss is connected to a bolt 253 which passes upwardly through the hollow center of the screw 251 and is likewise pivotally connected to one end of the rod 249. A nut 254 is threaded over the upper end of bolt 253 and between the nut and a knurled operating knob 255 constituting a part of the screw 251, there is disposed a spring 256. It can be seen that the spring 256 and the nut 254 act to bias the bolt 253, the boss 252 and the rod 249 upwardly, the bias being opposed by the screw 251. The adjustment of the angularity of the bars 249 and 246 is therefore accomplished by turning the knurled knob 255 and its equivalent on the other screws to place the bars 246 and 249 in such a position that their yarn contacting surface slopes slightly upwardly from left to right as viewed in Figure 16 so that they act as cams to push the coils of yarn back to the right as viewed in Figure 16 to close up the space between them. The bars 246 and 249 are provided with depending stop pins at their opposite ends, which are designated in the drawings at 246a and 249a.

The yarn issuing from the roller 101 does not pass directly onto the roller 105 but issues through a thread guiding eyelet 257 and passes then through the eyelet 258 of a stop wire 259 and then through an eyelet 260 and onto the roller 105. The eyelet 260 is held by a bracket 261 fastened to the frame element 183 and the drop wire 259 is pivoted from a switch box 262 also supported from the frame element 183. The drop wire 259 is normally biased to move in a counter-clockwise direction as it is viewed in Figure 12. As long as the thread holds it in the Figure 12 position, the machinery will operate, but in the event of thread breakage the wire 259 will move counter-clockwise from the Figure 12 position and through switches in the switch box 262 shut off the driving motor 191.

It has been stated before that rollers 104 and 105 are drying rollers. The manner in which they effect the drying operation can best be understood by reference to Figures 16, 17 and 18, in which the details of the roller 105 are shown. Although the roller 104 is not shown in detail, it will be understood that it is similar to roller 105 so that a description of one will suffice for both.

The roller 105 is provided with a hub 263 which is fastened to the shaft 133 by a set screw 264. The hub 263 is provided with a flange 265 which is connected to an annular disc 266 that constitutes the right hand end face of the roller 105. A steel shell 267 which constitutes the outer surface of the roller 105 is held by an annular weld 268 to the disc 266 and, within this shell, there is located an aluminum body 269 having helically cast therein a Calrod unit 270 having a terminal 271 at the right hand end of the unit and a terminal 272 at the left hand end of the unit. The aluminum body 269 is provided with lugs at 273 and 274 which support a strap 275 which in turn supports a thermostat 276. The terminal 272 of the Calrod 270 is connected through the thermostat 276 to a brush ring 277 mounted on a disc 278 of insulating material, i. e., electrically non-conductive, which is held by marginal bolts 279 to the outer end of the aluminum body 269. Between the insulation disc 278 and the interior of cylinder 105, there is disposed a disc of asbestos 280 constituting a heat insulating layer separating the disc 278 from the heated zone within the roller 105. In addition to the brush ring 277, the insulation disc 278 is also provided with a brush ring 281 which is connected to the terminal 271 of the Calrod 270. A "Calrod" unit can be described as an electrical resistance heating element fashioned by embedding a resistance wire or other electrical resistance inside of a layer of material such as magnesium oxide powder and encasing both the resistance and the powder in an outside metal cover which is bendable to a desired shape.

It will now be understood that the shaft 133 drives the hub 263 with its integral flange 265 and that the flange 265, through the bolts, drives the disc 266, which, through bolts, drives the aluminum body 269, and through the weld drives the shell 267. The asbestos disc 280, the insulating disc 278, the thermostat 276 and the brush rings 277 and 281 are all held in fixed relation to the aluminum body 269 and rotate with it. A shield 282 is located at one end of the roller 105 and a flange of the shield extends slightly into the shell 267. This shell is supported by a bracket 283 which is fastened to and extends from a cable conduit 284 which is supported from the standard 146, see Figures 9 and 14. Thus, the shield 282 is held in fixed position at the end of the rotating roller 105. The shield is provided with a brush box 285 from which spring-urged brushes 286 and 287 project into bearing relation to brush rings 277 and 281, respectively. Electric current is supplied to the brushes through connectors coming out of the cable box 284 and leading to the brush box 285. An adjusting screw 288 extends from the thermostat out through a central hole in the shield 282 in order that the make and break temperature of the thermostat 276 may be adjusted.

It should be noted that the thermostat is exposed to the radiant heat from the aluminum body 269 and that radiant heat is primarily responsible for the operation of the thermostat. Due to the position of the asbestos shield 280, the thermostat 276 is entirely enclosed and is therefore reliable to control the temperature of the shell 267.

The roller 104, as has been stated above, is equipped with a heating arrangement of the type shown in Figure 16 and the parts of that heating arrangement are not shown except for the front shell or shield which is indicated in Figure 9 by numeral 289 and its supporting bracket which bears numeral 290. In view of the fact that the thermostat is radiant heat controlled, the single thermostat in roller 105 is connected to control the circuit to the Calrods in both of rollers 104 and 105.

It will be observed that the shell 267 is tapered about half a degree such that the right hand end of the shell, as it is viewed in Figure 16, has larger external diameter than the left hand end. This taper is for the purpose of compensating for the shrinkage of the yarn which occurs incident to drying. From Figure 16 it is also apparent that roller 100 is tapered about 1 and ½%, the left hand end of the roller having a greater external diameter than the right hand end. This taper is for the purpose of imparting stretch to the yarn during mercerizing as the yarn progresses from right to left on the machine as it is viewed in Figure 10. Roller 104 is tapered the same as roller 105 and roller 101 is tapered the same as roller 100. The squeeze roller 199 is also tapered 1 and ½% so that it will assume the same peripheral speed as roller 101 all the way across without slippage. Note that roller 199 is larger at the left hand end as it is viewed in Figure 19.

The various padding rollers 160, 162, 163 and 164, which have already been described, receive the liquids which they apply to the yarn by rotating partly immersed in those liquids. The liquids are held in compartments 291, 292 and 293, which are formed by partitions extending upwardly from the bottom of a single pan 294, the shape of which can be fully understood by concurrent reference to Figures 10, 13 and 15. Note in Figure 13 that a partition 295 separates compartment 291 from compartment 292 and that a partition 296 separates compartment 292 from compartment 293. Above the pan 294 there is located a smaller pan 297 which extends above the portions of compartments 293 and 292 that lie under the squeeze roller 199 and that terminates above the partition 295. The upper pan 297 is subdivided into two compartments 298 and 299 by a partition 300 which lies directly above the partition 296 of the pan 294. The left wall 301 of the upper pan 297, as that pan is viewed in Figure 15, is higher than the remaining walls and extends beyond the boundary wall of the compartment 299 for a distance substantially equal to the width of the compartment 291, see Figure 19. A wall member 302, integral with the wall 301 but lower in height, extends above the right hand end wall of the pan 294 as it is viewed in Figure 19. The pan 297 is not separately supported but simply rests on the lower pan 294. Since the upper pan 297 is intended to recover liquids that are squeezed out between the squeeze roller 199 and the thread-storage thread-advancing roller 101, drains 303 and 304 are provided, any liquid falling into the compartments 298 and 299 resulting from the squeezing of the yarn.

The purpose of providing pans that are divided into compartments is so that the treating liquids can be delivered, recirculated and recovered in an efficient manner. A delivery pipe 305 delivers a caustic solution to compartment 291 and a drain stand pipe 305a maintains the caustic level in that compartment. The caustic from compartment 291 is delivered to the yarns by padding roller 160. Since this is the first application of any liquid to the yarn, it is apparent that the caustic concentration is very high and that the caustic can be re-used a large number of times without regeneration. This being the case, there is no upper pan overlying the compartment 291 and caustic squeezed out above the compartment 291 between the squeeze roller 199 and the roller 101 drops back to the compartment 291 to be reapplied to succeeding lengths of yarn by the padding roller 160. Water is supplied to the compartment 292 through a delivery pipe 306. Since water from the compartment 292 is applied to the yarns by the padding roller 162 at a time when the yarns are quite saturated with caustic, it is apparent that the water squeezed from the yarns and falling into the compartment 298 is worth regeneration and it is drawn off for regeneration through drain 303. The liquid level is maintained in the compartment 292 by a stand pipe drain 306a.

Water is also supplied to compartment 293 through a delivery pipe 307. This water, which is applied to the yarn by padding rollers 163 and 164, washes yarns that are already relatively free of caustic so that the water recovered in the compartment 299 is scarcely worth regeneration and is drawn off through pipe 304 to waste. The liquid level in the compartment 293 is maintained by a stand pipe drain 307a.

It has been found that, in the interests of operator safety and machine maintenance, it is very desirable to shield the rollers 100, 101 and 199 as fully as may be possible. To this end, end shields 308 and 309 are provided, see Figure 19, these shields being held from frame elements 139 and 140, respectively, by brackets 310 and 311. These shields substantially register with the end walls 312 and 313 of the hood 127. The end shields 312 and 313 have cutouts for registry with the various shafts of the machine.

In order to afford a certain measure of adjustability in respect to the distribution of the liquid squeezed from the yarn by the squeeze roller 199, adjustable partitions 314 and 315 are disposed above the right hand end partition of the pan 297, see Figure 19, and above the partition 300. The adjustable partitions 314 and 315 are provided with integral brackets 316 and 317, respectively, and a bolt 318 passing through these brackets is slidable in a slot in the back wall 301 whereby the partitions may be shifted from left to right to afford minor adjustment of the mouths of the compartments 291, 293 and 299. Since the width of the mouths of the compartments 291, 298 and 299 controls the distribution to those compartments of the liquid recovered by the squeeze roller 199, it is seen that the distribution of the recovered liquid is controlled primarily by the position of the right end wall of the pan 297 (Figure 19) and the partition 300 and secondarily by the position of the partitions 314 and 315.

In Figure 15, the locking bolt which is associated with the adjustable partition 315 is indicated by reference character 318. Also in Figure 15 there is shown a bar 319 on which the pan 294 is supported. This bar slides under the machine and is held against removal by a latch 320 pivoted to part of the frame 140. The latch 320 seats in an annular groove provided in the bar 319 adjacent one of its ends, see Figure 14.

The stop wire 123 which controls the stoppage of the machine in the event of thread breakage between the supply package 102—103 and the thread storage-thread advancing cylinders 100—101 has been described, as well as the stop wire 259, which functions between the pair of rollers 100—101 and the pair of rollers 104—105. A similar arrangement is also provided between the pair of rollers 104—105 and the spindle 106 of the twister mechanism. This stop wire bears reference numeral 321 and its active portion lies in the thread path between guides 322 and 323. The associated switch box is shown at 324, see Figure 10. It will be observed that both the switch box 324 and the guide 323 are supported from an L-bracket 325 which is attached to and extends out from the frame 140, see Figures 12 and 14. A small standard 326, which extends upwardly from the free end of the L-bracket 325, serves to support the guide 322.

The stop wire 321 is normally biased away from the position shown in Figure 12 and is held in the Figure 12 position by the thread. Upon breakage, it moves away from the Figure 12 position and de-energizes the machine in the manner previously described in connection with stop wires 123 and 259.

In all of the foregoing description, reference has been made to a single mercerizing and drying unit. In actual practice, a plurality of such units are arranged side by side, as indicated by the fragment at the right of Figure 9, although it is contemplated that the twisting mechanism be common to a number of units.

In the operation of the machine of Figures 9 to 24, inclusive, it is necessary to establish the caustic and water baths in the compartments 291, 294 and 293. The compartment 291 is filled with a mercerizing caustic of approximately 50–55° Tw. at room temperature. The level of the solution in the compartment 291 is controlled by the stand pipe 305a. Cold water, which has been softened, is supplied to the compartments 292 and 293. While the compartments of the pan 294 are being filled, the circuit to the heating units 270 of the drying rollers 105 and 104 are closed and the thread contacting the shells of these rollers will reach operating temperatures in about three to five minutes.

With the bodies of treating liquid established in the pan 294 and the drying rollers hot, i. e. at a temperature of about 150 to 190° F., the operator places package 102 and 103 in position on the spindles as shown in Figure 9 and leads the thread from one of them through the guides 114, 121 and 132 onto roller 100. In the thread path between guides 114 and 121, the tensioning fingers 122 are threaded in and the stop motion wire 123 is placed in its operative position as shown in Figures 20 and 21. Once yarn is available at the roller 100, the operator winds a loop around rollers 100 and 101 and ties it. It will be understood that in order to wrap a loop around rollers 100 and 101, it is necessary that the squeeze roller 199 be released from bearing engagement against the roller 101. This is accomplished by operation of the mechanism controlled from handle 223, the details of which have already been described. As soon as the loop is tied around the rollers 100 and 101, the squeeze roller 199 is restored to its formal position in bearing engagement against the roller 101. The motor 191 is now actuated and a generally helical body of yarn is wound onto the two rollers 100 and 101 until the length of those two rollers between the depending pins 246a is filled, whereupon the operator stop the motor, cuts the loop and leads the free end of the yarn through the guides 257, 258 and 260 and onto the roller 105. He then winds a loop around the rollers 104 and 105 and ties it, and again actuates the machine to form a helical body of thread on rollers 104 and 105 for the length of those rollers between the depending pins 249a. When the body of yarn reaches the left hand pin 249a, see Figure 16, the operator again cuts the loop and leads the free end through guides 322 and 323 to a bobbin on spindle 106. Meanwhile, the motor 243 has been started and the twister ring frame is reciprocating through operation of the mechanisms already described. The motor 191 is now actuated again and the machine is in full operation until such time as doffing of the bobbin on the spindle 106 is required.

Should yarn breakage occur at any of the various stages of the machine, one of the stop motion mechanisms will take effect and immobilize the machine until the operator ties the broken ends and restores operation manually.

It will be observed upon reference to Figure 11 that arrangements are made for controlling the relative speed of the rollers 100 and 101. It is contemplated, regardless of the weight of yarn being mercerized, that the rollers 100 and 101 be operated at the same speed. Since caustic consumption is related to yarn weight, it is apparent that the caustic must be delivered to the yarn at a higher rate for heavy yarn than for a light one and this adjustment is accomplished by increasing the rotational speed of the padding roller 160 for the heavier yarns. The speeds of the padding roller 160 (from 30 to 100 R. P. M.) relative to the speeds of the rollers 100 and 101 (1200 to 1500 R. P. M.) is such that, even with the padding roller operating at its maximum speed, it turns very much more slowly than the rollers 100 and 101.

It will be recalled that the washing roller 43 of the form of the invention shown in Figure 2 turns oppositely to the direction of yarn movement at the point of contact between the yarn and the roller. On the other hand, in the form of the invention shown in Figures 9 to 24, inclusive, the washing rollers 162, 163 and 164 all turn in the same direction as the yarn at the point of contact. It has been found that the washing effect is enhanced by running the washing rollers in the same direction as the yarn albeit at a lower speed. This enhanced washing effect is believed to result from the fact that less of the water is brushed from the padding roller by the movement of the yarn and more of it is carried with the yarn and squeezed through the body of the yarn by the action of the squeeze roller 199. The efficiency of the arrangement of Figure 10 as compared to the arrangement of Figure 2 can be appreciated when it is noted that the residual caustic in the yarn after washing is reduced to about ½% with the Figure 10 arrangement as compared to about 1 and ½% to 2% with the Figure 2 arrangement.

Caustic padding roller 160 turns at a slower rate and in an opposite direction to water padding rollers 162, 163 and 164, since it is the object to apply the mercerizing caustic at a much lower rate than the washing water. This is because of the limiting factor of wetting out the yarn with caustic, so that any superfluous caustic is simply brushed and squeezed off with no beneficial effect until such wetting out of the yarn with the caustic has occurred. This is undesirable since such excess caustic so drawn off has a tendency to fly out at the ends of the machine causing a hazard to both the machine and the operator.

It will be noted that there are three water padders 162, 163 and 164. Padder 162 dips into water compartment 292 and padders 163 and 164 dip into water compartment 293. The compartment 292 is separated from compartment 293 by a partition 296 in order to prevent any appreciable caustic build up in the water in compartment 293.

The relatively caustic-free water in compartment 293 will maintain high washing efficiency.

Between the squeeze roller 199 and the roller 101 there is a tendency to the formation of a somewhat wedge-shaped axially continuous body of water just below the point of mutual tangential contact of these two rollers. The discharge of this axial body of liquid at the ends of the respective rollers is quite objectionable and it has been found that it can be almost wholly controlled by sub-dividing the water applicator padder into a plurality of axially separate units. Thus, in the space between the padder 162 and the padder 163, no liquid is applied to the yarn and consequently not so much is available to be squeezed out by the padding roller and the axial continuity of the liquid body between the roller 101 and the squeeze roller 199 is interrupted. This additionally prevents excessive caustic contamination of the relatively clean water bath in the compartment 293. The effect of the spacing between the padders 163 and 164 is essentially the same, i. e., to break up the axial continuity of the liquid body formed between the squeeze roller 199 and the roller 101.

The pressure exerted by the squeeze roller 199 and the kneading effect achieved by the bar 246, have both been found to be extremely important in the production of high quality mercerized yarn. It is to be understood that the pressure exerted by the squeeze roller 199 is adjustable by varying the position of the connection between the threaded rod 219 and the bar 218. This is done by loosening the nuts on the rod 219 (see Figure 13) and changing the effective length of the rod 219. The purpose of the adjustment is to compensate for yarns of different weights. Likewise, heavy yarns occupy more space on the rollers, and it is usually necessary to adjust the bars 246 and 249, as well as the angularity of the shaft 133, when a substantial change in the weight of the yarn to be treated is undertaken.

This application is a continuation-in-part of prior application Serial No. 341, filed January 2, 1948, now Patent No. 2,647,037.

What is claimed is:

1. A machine for the continuous liquid treatment of yarns which comprises a pair of spaced rotatably mounted tapered rollers having their axes askew for advancing the yarn therealong in a plurality of closely spaced generally helical turns, means for guiding yarn onto the receiving end of one of said rollers, means for withdrawing the yarn from the take-off end of one of said rollers, and a yarn contacting applicator positioned between the said rollers for applying a treating solution to the yarn out of contact with said rollers as it progresses along said rollers.

2. A machine for the continuous liquid treatment of yarns, which comprises a pair of spaced rotatably mounted tapered rollers having their axes askew for advancing the yarn therealong in a plurality of closely spaced generally helical turns, means for leading a yarn to the receiving end of one of said rollers, means for withdrawing the yarn from the take-off end of one of said rollers, a contact applicator for applying a treating solution to a portion of the yarn between the rollers at the initial portion of its progress along said rollers, and a contact applicator for thereafter applying another treating liquid to a portion of the yarn between the rollers while it progresses along said rollers, said last two applying means being axially spaced from each other to prevent premature admixture of the treating solutions.

3. A machine for the continuous liquid treatment of yarns which comprises a pair of horizontally spaced rotatably mounted tapered rollers having their axes askew to serve to stretch the yarn while it advances therealong in closely spaced generally helical turns, means for leading a yarn to the receiving end of one of said rollers, means for withdrawing the yarn from the take-off end of one of said rollers, and a contact applicator positioned beneath the rollers to apply a treating solution to the yarn in its lower run between the surfaces of said rollers.

4. A machine for the continuous liquid treatment of yarns which comprises a pair of horizontally spaced rotatably mounted rollers having their axes askew to advance a yarn therealong in closely spaced generally helical turns, means for leading a yarn to the receiving end of one of said rollers, means for withdrawing the yarn from the take-off end of one of said rollers, a continuous contact applicator means for applying a treating solution simultaneously to a portion of the plurality of turns of the yarn in its lower run between the rollers and means to subject each helical turn of yarn to a squeezing action after each application of treating solution thereto and before the next such application.

5. A machine for the continuous liquid treatment of yarns which comprises a pair of horizontally spaced rotatably mounted rollers having their axes askew to serve to advance a yarn therealong in closely spaced generally helical turns, means for leading a yarn to the receiving end of one of said rollers, means for applying a treating solution simultaneously to a portion of the plurality of turns of the yarn in its lower run between the surfaces of said rollers, and a squeeze roller pressing on substantially the full length of the roller to which the yarn advances after such application to remove the excess solution from the yarn.

6. A machine for the continuous liquid treatment of yarns which comprises a pair of horizontally spaced rotatably mounted rollers having their axes askew to serve to advance a yarn therealong in closely spaced generally helical turns, means for leading a yarn to the receiving end of one of said rollers, means for withdrawing the yarn from the take-off end of one of said rollers, means for applying a first treating liquid to the yarn immediately after the yarn leaves one of the rollers in its lower run to the other roller and during the initial portion of the progress of the yarn along said rollers, means for thereafter applying a second treating liquid to the yarn also immediately after the yarn leaves said one roller in its lower run to the other roller, and a squeeze roller pressing on substantially the full length of the other roller to remove the excess liquids from the yarn.

7. A machine for the continuous mercerization of yarns which comprises a pair of horizontally spaced rotatably mounted rollers having their axes askew to serve to advance a yarn therealong in closely spaced generally helical turns, means for leading a yarn to the receiving end of one of said rollers, means for withdrawing the yarn from the take-off end of one of said rollers, a first padder roller for applying a mercerizing solution to the yarn in its lower run between the surfaces of said rollers, a second padder roller for thereafter applying a washing liquid to the yarn also in the lower run of the yarn between said rollers, a shaft mounting said padding rollers, troughs into which said padder rollers dip for containing the liquids to be applied to the yarn, means for rotating the shaft to rotate said padder rollers and thereby bring the mercerizing solution and washing liquid into contact with the yarn, and a squeeze roller pressing on the full length of the roller first contacted by the yarn after application of the liquids to remove the excess liquids from the yarn.

8. Apparatus for the high speed continuous liquid treatment of cotton threads comprising a thread storage thread advancing device including two horizontally spaced rollers with askew axes for advancing thread in a generally helical course therealong, means for delivering succeeding portions of a thread to the receiving end of one of said rollers, means for withdrawing succeeding portions of thread from the take-off end of one of said rollers, a treating liquid applicator roller, means positioning said applicator roller below and substantially parallel to said storage and advancing rollers with its upper surface tangent to the lower run of the thread between said storage and advancing rollers, a squeeze device bearing on one of said storage and advancing rollers, means to drive all of said rollers to cause the lower run of thread between the storage and advancing rollers to contact first the applicator roller and then the squeeze device, and trough means below said rollers for collecting liquid discharged from the lower run of said thread and squeezed out by said squeeze device whereby the thread in its upper run is dry enough so that appreciable centrifugal discharge of the treating liquid is avoided under high speed conditions of operation.

9. Apparatus for the high speed continuous liquid treatment of cotton threads comprising a thread storage thread advancing device including two horizontally spaced rollers with askew axes for advancing thread in a generally helical course therealong, means for delivering succeeding portions of a thread to the receiving end of one of said rollers, means for withdrawing succeeding portions of thread from the take-off end of one of said rollers, a treating liquid applicator roller, means positioning said applicator roller below and substantially parallel to said storage and advancing rollers with its upper surface tangent to the lower run of the thread between said storage and advancing rollers, a squeeze device bearing on one of said storage and advancing rollers, said applicator roller being located further from the storage and advancing roller against which the squeeze device bears than from the other storage and advancing roller, means to drive all of said rollers to cause the lower run of thread between the storage and advancing rollers to contact first the applicator roller and then the squeeze device, and trough means below said rollers for collecting liquid discharged from the lower run of said thread and squeezed out by said squeeze device whereby the thread in its upper run is dry enough so that appreciable centrifugal discharge of the treating liquid is avoided under high speed conditions of operation.

10. Apparatus for the high speed continuous liquid treatment of cotton threads comprising a thread storage thread advancing device including two horizontally spaced rollers with askew axes for advancing thread in a generally helical course therealong, means for delivering succeeding portions of thread to the receiving end of one of said rollers, means for withdrawing succeeding portions of thread from the take-off end of one of said rollers, a padding roller of smaller diameter than the storage and advancing rollers, means positioning said padding roller below and substantially parallel to said storage and advancing rollers with its upper surface tangent to the lower run of the thread between said storage and advancing rollers, a squeeze device bearing on one of said storage and advancing rollers, means to drive said storage and advancing rollers in unison to cause the lower run of thread between the storage and advancing rollers to contact first the padding roller and then the squeeze device, positive driving means for driving the padding roller at an appreciably lower peripheral speed than said storage and advancing rollers, and trough means below said rollers for collecting liquid discharged from the lower run of said thread and squeezed out by said squeeze device.

11. Apparatus for the high speed continuous liquid treatment of cotton threads comprising a thread storage thread advancing device including two horizontally spaced rollers with askew axes for advancing thread in a generally helical course therealong, means for delivering succeeding portions of thread to the receiving end of one of said rollers, means for withdrawing succeeding portions of thread from the take-off end of one of said rollers, a plurality of treating liquid applicator rollers, means coaxially positioning said rollers below and substantially parallel to said storage and advancing rollers with their upper surfaces tangent to the lower run of the thread between said storage and advancing rollers, a squeeze device bearing on one of said storage and advancing rollers, the length of said device at least equaling the total length of said applicator rollers, means to drive said storage and advancing rollers in a direction to cause the lower run of thread between them to contact first one of the applicator rollers and then the squeeze device, means for driving the applicator rollers and a plurality of trough below said rollers for separately collecting liquid discharged from the lower run of said thread and squeezed out by said squeeze device, said troughs being not less than equal in length to the length of the respective applicator rollers.

12. Apparatus for the high speed continuous liquid treatment of cotton threads comprising a thread storage thread advancing device including two horizontally spaced rollers with askew axes for advancing thread in a generally helical course therealong, means for delivering succeeding portions of a thread to the receiving end of one of said rollers, means for withdrawing succeeding portions of thread from the take-off end of one of said rollers, a treating liquid applicator roller, means positioning said applicator roller below and substantially parallel to said storage and advancing rollers, with its upper surface tangent to the lower run of the thread between said storage and advancing rollers, a squeeze cylinder bearing on one of said storage and advancing rollers, means to drive all of said rollers to cause the lower run of thread between the storage and advancing rollers to contact first the applicator roller and then the squeeze cylinder, trough means below said rollers for collecting liquid from the lower run of said thread and squeezed out by said squeeze cylinder, an elongated tensioning member disposed generally parallel to said rollers and in position to contact the upper run of the threads therebetween, the thread contacting surface of said member being so inclined as to cause the coils of thread bearing thereagainst to progress toward the thread receiving end of the rollers to close up the spaces between the coils caused by the horizontal spacing of the rollers so that spaces between the thread in the vicinity of the squeeze cylinder are avoided and liquid recovery is enhanced.

13. Apparatus for the high speed continuous liquid treatment of cotton threads comprising a thread storage thread advancing device including two horizontally spaced rollers with askew axes for advancing thread in a generally helical course therealong, means for delivering succeeding portions of a thread to the receiving end of one of said rollers, means for withdrawing succeeding portions of thread from the take-off end of one of said rollers, a caustic applicator roller, wash water applicator rollers, means positioning said applicator rollers in axially spaced relation below and substantially parallel to said storage and advancing rollers with their respective upper surfaces tangent to the lower run of the thread between said storage and advancing rollers, means to drive said caustic applicator roller with its thread contacting surface moving slower and in the same direction as the thread at the point of contact, means to drive said water applicator rollers with their thread contacting surfaces moving slower and in the opposite direction to the thread at the point of contact, a squeeze cylinder bearing on that thread storage and advancing roller toward which the thread moves in its lower run, a caustic bath container in the path of rotation of said caustic applicator roller and water bath containers in the path of rotation of said water applicator rollers.

14. Apparatus for the high speed continuous liquid treatment of cotton threads comprising a thread storage thread advancing device including two horizontally paced rollers with askew axes for advancing thread in a generally helical course therealong, means for delivering succeeding portions of thread to the receiving end of one of rollers, means for withdrawing succeeding portions of thread from the take-off end of one of said rollers, a caustic applicator roller, a water applicator roller, means positioning said rollers in axially offset relation below and substantially parallel to said storage and advancing rollers with their upper surfaces tangent to the lower run of the thread between said storage and advancing rollers, a squeeze cylinder bearing on one of said storage and advancing rollers, the length of said cylinder at least equaling the total length of said applicator rollers and the space between them, said squeeze cylinder having a resilient surface of a Shore hardness of from 50 to 70, means to drive said storage and advancing rollers in a direction to cause the lower run of thread between them to contact first one of the applicator rollers and then the squeeze cylinder, means for driving the applicator rollers and a plurality of troughs below said cylinder for separately collecting liquid discharged from the lower run of said thread and squeezed out by said squeeze device, said troughs being not less than equal in length to the length of the respective applicator rollers.

15. Apparatus for the high speed continuous liquid treatment of cotton threads comprising a thread storage thread advancing device including two horizontally spaced rollers with askew axes for advancing thread in a generally helical course therealong, means for delivering succeeding portions of thread to the receiving end of one of said rollers, means for withdrawing succeeding portions of thread from the take-off end of one of said rollers, a caustic applicator roller, a plurality of water applicator rollers, means positioning said rollers in axially offset relation below and substantially parallel to said storage and advancing rollers with their upper surfaces tangent to the lower run of the thread between said storage and advancing rollers and the caustic applicator roller in position to first contact the thread in its travel across said storage and advancing rollers, a squeeze cylinder in compressive engagement with one of said storage and advancing rollers, said cylinder being axially coextensive with all of said applicator rollers, a transversely extending trough for supplying liquid to said caustic applicator roller and for recovering caustic squeezed from the thread by said squeeze cylinder, a first water recovery trough for recovering the water applied by the first water applicator roller, a second water recovery trough for recovering the water applied by the remaining water applicator rollers, said troughs being separated by partitions extending under the point of tangential contact between said cylinder and the roller against which it bears so that the caustic the first-applied wash water and the later-applied wash water are separately recovered, means to drive said storage and advancing rollers in a direction to cause the lower run of thread between them to contact first one of the applicator rollers and then the squeeze cylinder.

16. Apparatus as claimed in claim 15 in which said partitions are adjustable axially of the length of the thread storage thread advancing device.

17. Apparatus for the high speed continuous liquid treatment of cotton threads comprising a thread storage thread advancing device including two horizontally spaced rollers with askew axes for advancing thread in a generally helical course thereon, means for delivering succeeding portions of thread to the receiving end of one of said rollers, means for withdrawing succeeding portions of thread from the take-off end of one of said rollers, said rollers progressively increasing in diameter from said receiving end to said take-off end, a caustic applicator roller, water applicator rollers, means positioning said rollers in axially offset relation below and substantially parallel to said storage and advancing rollers with their upper surfaces tangent to the lower run of the thread between said storage and advancing rollers, bath containers for supplying liquid to said applicator rollers, a squeeze cylinder bearing on one of said storage and advancing rollers and being substantially coextensive in length therewith, said squeeze cylinder tapering in the same direction as the storage and advancing roller against which it bears and having the same percentage of taper, means to drive said storage and advancing rollers in a direction to cause the lower run of the thread between them to contact first one of the applicator rollers and then the squeeze cylinder.

18. Apparatus as claimed in claim 13 further comprising means to adjust the speed at which the applicator rollers are driven, means to adjust the pressure of the bearing engagement of the squeeze cylinder against the thread storage thread advancing rollers and means to adjust the askew relation of the thread storage thread advancing device whereby to accommodate yarns of different weights.

19. Apparatus for the high speed continuous liquid treatment of cotton threads comprising a thread storage-thread advancing device including two horizontally spaced rollers with askew axes for advancing thread in a generally helical course therealong, means for delivering succeeding portions of a thread to the receiving end of one of said rollers, means for withdrawing succeeding portions of thread from the take-off end of one of said rollers, a treating liquid applicator roller, means positioning said applicator roller below and substantially parallel to said storage and advancing rollers with its upper surface tangent to the lower run of the thread between said storage and advancing rollers, a squeeze cylinder bearing on one of said storage and advancing rollers, means to drive all of said rollers to cause the lower run of thread between the storage and advancing rollers to contact first the applicator roller and then the squeeze cylinder, an elongated tensioning member, means adjustably mounting said member from points adjacent its ends so that it lies in a position near the upper run of threads between said rollers and is generally parallel to said rollers, said adjustable means being susceptible of adjustment to dispose the member at an angle to a plane tangent to the upper surfaces of the storage and advancing rollers and in contact with the upper run of the thread therebetween to close up the space between adjacent coils.

References Cited in the file of this patent

UNITED STATES PATENTS

| Number | Name | Date |
|---|---|---|
| 48,053 | Clarke | June 6, 1865 |
| 83,890 | Thompson | Nov. 10, 1868 |
| 493,627 | Kohlrausch | Mar. 21, 1893 |
| 1,165,896 | Palmer | Dec. 28, 1915 |
| 2,034,657 | Hartmann et al. | Mar. 17, 1936 |
| 2,090,064 | Oppenlaender | Aug. 17, 1937 |
| 2,189,195 | Burkholder | Feb. 6, 1940 |
| 2,194,084 | Gulbrandsen | Mar. 19, 1940 |
| 2,254,251 | Uytenbogaart | Sept. 2, 1941 |
| 2,294,902 | Gram | Sept. 8, 1942 |
| 2,320,956 | Turcotte | June 1, 1943 |
| 2,346,585 | Job | Apr. 11, 1944 |
| 2,358,427 | Traill | Sept. 19, 1944 |
| 2,367,730 | Masland, 2d | Jan. 23, 1945 |
| 2,382,081 | Luaces | Aug. 14, 1945 |
| 2,416,535 | Naumann | Feb. 25, 1947 |
| 2,456,120 | Furness | Dec. 14, 1948 |
| 2,504,703 | Kuljian | Apr. 18, 1950 |

FOREIGN PATENTS

| Number | Country | Date |
|---|---|---|
| 27,871 | Great Britain | Oct. 12, 1905 |
| 448,774 | Great Britain | June 11, 1936 |